(12) United States Patent
Smith

(10) Patent No.: US 7,801,739 B2
(45) Date of Patent: Sep. 21, 2010

(54) SYSTEM, METHOD AND COMPUTER PROGRAM PRODUCT FOR FACILITATING A REAL ESTATE EXCHANGE

(76) Inventor: Jeffrey C. Smith, 7878 Pale Moon Ct., Fairhope, AL (US) 36532

( * ) Notice: Subject to any disclaimer, the term of this patent is extended or adjusted under 35 U.S.C. 154(b) by 992 days.

(21) Appl. No.: 11/556,280

(22) Filed: Nov. 3, 2006

(65) Prior Publication Data

US 2007/0061162 A1 Mar. 15, 2007

Related U.S. Application Data

(63) Continuation-in-part of application No. 10/890,548, filed on Jul. 13, 2004, now Pat. No. 7,152,037.

(60) Provisional application No. 60/565,554, filed on Apr. 27, 2004, provisional application No. 60/747,352, filed on May 16, 2006.

(51) Int. Cl.
 *G06Q 10/00* (2006.01)
(52) U.S. Cl. .......................................... 705/1.1; 705/26
(58) Field of Classification Search .................. 705/1, 705/26
See application file for complete search history.

(56) References Cited

U.S. PATENT DOCUMENTS 6,292,788 B1 * 9/2001 Roberts et al. .............. 705/36 T (Continued)

FOREIGN PATENT DOCUMENTS

GB 2 382 687 A 6/2003

OTHER PUBLICATIONS

Information on Rexinet, Retrieved on Dec. 14, 2000 from www.archive.org.*

(Continued)

*Primary Examiner*—Naresh Vig
(74) *Attorney, Agent, or Firm*—Alston & Bird LLP

(57) ABSTRACT

A method is provided for facilitating a real estate exchange that includes a sale portion and a purchase portion. The method includes identifying properties of an exchangor for the sale portion of the exchange, and properties of one or more sellers for the purchase portion of the exchange. The properties of the exchangor and the sellers have associated property information stored in a property database. The method also includes engaging the properties for the sale and purchase portions of the exchange to thereby facilitate the exchange. More particularly, engaging the properties includes providing a buyer with at least a portion of the property information associated with one or more properties identified for the sale portion of the exchange, and providing the exchangor with at least a portion of the property information associated with one or more properties identified for the purchase portion of the exchange.

15 Claims, 20 Drawing Sheets

U.S. PATENT DOCUMENTS

| | | | |
|---|---|---|---|
| 6,594,633 | B1 | 7/2003 | Broerman |
| 6,678,663 | B1 | 1/2004 | Mayo |
| 6,684,196 | B1 | 1/2004 | Mini et al. |
| 7,024,397 | B1 | 4/2006 | Donahue |
| 7,212,990 | B1 | 5/2007 | Greden et al. |
| 2002/0038280 | A1 | 3/2002 | Levy |
| 2002/0042770 | A1 | 4/2002 | Slyke et al. |
| 2002/0046038 | A1 | 4/2002 | Prokoski |
| 2002/0046065 | A1 | 4/2002 | Nighan |
| 2002/0046144 | A1 | 4/2002 | Graff |
| 2002/0052814 | A1* | 5/2002 | Ketterer ............... 705/35 |
| 2002/0065739 | A1 | 5/2002 | Florance et al. |
| 2002/0095346 | A1 | 7/2002 | Liss |
| 2002/0107764 | A1 | 8/2002 | McCoy |
| 2002/0169641 | A1 | 11/2002 | Wallace |
| 2002/0198801 | A1 | 12/2002 | Dixon et al. |
| 2003/0036963 | A1 | 2/2003 | Jacobson et al. |
| 2003/0120518 | A1* | 6/2003 | Galley ............... 705/4 |
| 2003/0187756 | A1 | 10/2003 | Klivington et al. |
| 2003/0229649 | A1 | 12/2003 | Herrero |
| 2004/0030616 | A1 | 2/2004 | Florance et al. |
| 2004/0030631 | A1 | 2/2004 | Brown et al. |
| 2004/0054606 | A1 | 3/2004 | Broerman |
| 2005/0160022 | A1 | 7/2005 | Chesney |
| 2005/0177488 | A1 | 8/2005 | Rexrode |
| 2006/0085210 | A1* | 4/2006 | Owens ............... 705/1 |
| 2007/0061162 | A1 | 3/2007 | Smith |

OTHER PUBLICATIONS

Information on Property Exchage LLC, Retrieved on Dec. 14, 2000 from www.archive.org.*

Brenden Sager, Prospective Buyers Ladbroke Track Post-Gazette Staff Writer, Dec. 10, 1999, Pittsburg Post—Gazette, p. B.5.*

Henry Stuart, There's Always a Catch, Nov. 2, 2005, Evening Standard London UK, p. 19.*

Sample of Real Estate Contract from Long & Foster Realtors labeled as L&F, 2000-2003.*

Rachel Emma Silvermann, Bartering to Avoid Taxes; Popular Real-Estate Strategy Is Increasingly Used to Defer Capital Gains on Other Assets, Dec. 20, 2005, Wall Street Journal, p. D.1.*

*Insurance Journal*; Article Entitled "Rent Shield Announces $120 Million Lloyd's Placement for Investment Property Risk"; 1 page; available at www.insurancejournal.com/news/international/2003/11/04/33773.htm; article dated Nov. 4, 2003.

Webpage from Aon Corporation; Entitled "Completion", 1 page; available at www.aon.com/uk/en/industry_specialisations/commercial_property/completion.jsp; site visited Feb. 22, 2007; Internet Archive provides a date of Dec. 21, 2003.

Industry News Article; Entitled "RentShield Formalizes Co-Brokerage Agreement with Aon"; 2 pages; available at www.propertysolutions.com/Home/Company/Industry_News/Articles/314; article dated Dec. 1, 2004.

Webpage from RentShield; Entitled "What is RentShield?"; 2 pages; available at www.rentshield.com/whatis.php; site visited Feb. 22, 2007; Internet Archive provides a date of Apr. 7, 2006.

Webpage from RentShield; Entitled "Services"; 2 pages (but $2^{nd}$ page blank); available at www.rentshield.com/guarantee.php; site visited Feb. 22, 2007.

National Real Estate Exchange Network; 29 pages; available at <http://www.1031commercialproperties.com> (visited Apr. 20, 2004).

*A Business Owner's Guide to Property and General Liability Insurance*; Real Estate Leasing Tips; The Center for Commercial Real Estate; 10 pages; available at <http://www.centerforcommercialrealestate.com/newsletter/insurance.htm> (visited Apr. 22, 2004).

The Citadel: InfoWorld: Commercial Lines: Coverage for Real Estate; 5 pages;available at http://www.citadel.ca/english/info/ibusiness/irealty/irealty.htm> (visited Apr. 22, 2004).

Information on www.FSBO.com, retrieved from www.archive.org on Oct. 30, 2002.

* cited by examiner

FACILITATOR SERVICE

*What if There was a Way to:*
Expose your property Very Confidentially to numerous
Buyers Nationwide, who routinely purchase your property type.
After mutual processing of a Non-Disclosure Agreement:
Buyers Get rent rolls, NOI, aerials, demographic mapping
and a radius based competition report with tenant mix
and sales of similar properties within a 50 mile radius

*Think of it!*

Immediate, confidential <u>direct</u> access to pre-qualified Buyers with assistance from a professional broker, not interference. No restrictive contracts, no road blocks to negotiations, no long lead times on responses to your inquiries and an environment that is far less litigious since you get uninterrupted personal access to a Buyer that has agreed to not look at any of our other properties until your mutual five day engagement period expires. You both have the time and opportunity to construct a deal with or without the assistance of a professional broker.

Property Program

A Buyer Simply clicks the info button below your box and up will come a non-disclosure, non-circumvent, agreement in which the initiating party agrees to pay Facilitator a small percentage fee only payable if the two parties consummate an agreement the fee to be paid from proceeds at closing. The vast majority of the time the Buyer will initiate the agreement and contact you directly once you approve their non-disclosure agreement we forwarded to you, however you have to opportunity to proactively engage any of our Buyers.

Buyers embrace Facilitator's Service for several reasons. Having the ability to enter into private negotiations with a property they have thoroughly analyzed prior to initial Seller contact and gaining access to properties that are not shopped over by numerous buyers sets up a much more positive buying environment.

With Facilitator, only serious parties engage each other as their access to other parties is limited during the engagement process.

The Buyer initiated non-disclosure agreement when received by Facilitator is forwarded to the Seller for signature acceptance at which time a password is forwarded to the Buyer which opens up the appropriate folder full of our pre-prepared data including but not limited to:

Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime.

Buyer and Seller information are then temporarily locked from further outside access for five days giving both parties the time, peace of mind and opportunity to enter into a contract to finish due diligence with each other. Approved Party Contracts, LOI's, 1031 Intermediaries, Title Companies and Agency Forms are all available for either party through Facilitator's Service if you need them.

Buyer and Seller information is consistently updated for accuracy, and new entries are emailed out to parties that have requested that specific information on requested property

[Acquisition Entities] [Seller Sign Up]

FIG. 6.

FACILITATOR SERVICE

What if There was a Way to:
Get an *exclusive* look at available Commercial Real Properties
That are in the path of growth and have supporting incomes & traffic!
Get rent rolls, NOI, aerials, demographic mapping!
Get a radius based competition report with tenant mix!
And get current sales comps of similar properties within a 50 mile radius!

ON PROPERTIES THAT ARE AVAILABLE
BUT NOT PUBLICLY SHOPPED, MASS ADVERTISED
OR OFFERED IN A BIDDING ENVIRONMENT

Think of it!
Good data on pre-screened properties, immediate direct access to the Seller with assistance from a professional broker, not interference. No restrictive contracts, no road blocks to negotiations, no long lead times on responses to your inquiries and an environment that is far less litigious since you get to do your own assisted due diligence thru uninterrupted personal access to a Seller that has agreed to not to engage our other Buyers until your mutual five day engagement period expires.

Acquisition Program

Simply click property info button below each property and up will come a non-disclosure, non-circumvent, agreement in which the initiating party agrees to pay Facilitator a small percentage fee only payable should you consummate an agreement with one of our featured properties, and paid at closing to a local broker. Once initiated, as a Buyer you have access to all our available, confidential, properties though out the county and have the ability to list your buying parameters on Facilitator's Service FREE OF CHARGE, giving hundreds of Sellers direct access to You!

Sellers embrace Facilitator's Service for several reasons. Retailers and Apartment Owners get to feature their properties to hundreds of Buyers nationwide, without having to list with a specific entity for an extended period of time, without having their tenants, competitors or nuisance inquiries knowing their business. Mass marketing without the negative exposure.

With Facilitator, only serious parties engage each other as their access to other parties is limited during the engagement process.

The agreement when received by Facilitator is forwarded to the Seller for signature and then a password is forwarded to the Buyer which opens up the appropriate folder full of pertinent data including but not limited to:

Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF
Income, Population, Consumer Expenditure, Retail Sales Potential, & Crime.

Buyer and Seller information is then locked from further outside access for five days giving both parties the time, peace of mind and opportunity to enter into a contract to finish due diligence with each other. Approved Party Contracts, LOI's, 1031 Intermediaries, Title Companies and Agency Forms are all available for either party through Facilitator if you need them.

Buyer and Seller information is updated monthly for accuracy, and new entries are emailed out to parties that have requested that specific information on requested property types.

| Available Properties | Buyer Qualifications |
| --- | --- |
| Realtor Participation | Acquisition Entity Sign Up |

FIG. 7.

FACILITATOR SERVICE

PROGRAM QUALIFICATIONS

Facilitator's service is a unique Commercial Real Estate acquisition and disposition model that focuses on the needs of today's buyer and seller by streamlining the sales process utilizing the best of the traditional marketplace model and eliminating the factors that hinder both buyer and seller.

Facilitator's service is the new model for the serious participant. Buyers and Sellers are registered contenders ready, willing and able to perform if the deal is real. Service participants are the heart beat of the Commercial Real Estate Industry.

Due to the fact that Buyer and Seller are offering to exchange specific information with each other and engage each other exclusively for a brief limited time period, both parties must be qualified participants.

SELLER QUALIFICATIONS

Facilitator spends considerable time and expense thoroughly evaluating each and every property featured by Facilitator. Available properties are not idle, outdated or misrepresented listings. Available properties are available, recently confirmed and thoroughly evaluated. Facilitator supplies our Buyers with some of the most comprehensive pre-screened data in the industry.

The Seller must fully comply with the Facilitator confirmation or correction process. The Seller must supply all required information but in turn fully controls the release of that data by approving the engagement of any Buyer prior authorizing Facilitator to release the data to each specific Buyer. All data supplied to Facilitator will be verified by Facilitator. Each property will be mapped out with consumer expenditures, traffic and incomes as well as be coupled with a thorough competition report so each Buyer will quickly understand the viability price-risk relationship of that property. Each Seller must agree to negotiate in good faith with a qualified ready willing and able Buyer.

BUYER QUALIFICATIONS

Today's market is one in which demand exceeds supply. Supply however is considerably less limited through the advent of Facilitator's service due the confidentiality nature and streamlined process of Facilitator. Many of the restrictions imposed upon the Seller are alleviated through Facilitator's service.

Buyers although plentiful are the driving force in today's commercial real estate market and as a result are vital to Facilitator's service. Buyers must be legitimate, qualified and registered on Facilitator's website. Buyers must have a proven history of purchasing featured property types and supply details of such. Only registered Buyers will be able to engage a Seller. Sellers have the ability to preview Buyer qualifications prior to the Buyer being able to engage the Seller. This is done via our non-disclosure processing/approval stage which is normally completed within minutes or hours of the buyer's request for information.

As a result the Buyer has the luxury of previewing and getting an exclusive look at our supply of available properties in a much more enjoyable and positive environment.

FIG. 8.

Facilitator Sales Model Confidential Signup

I am forwarding the following information to Facilitator with the strict understanding that I may revoke* the enclosed information from the Facilitator's Website & System at any time. The following information is forwarded in two categories – confidential and non-confidential property brief information. The confidential information is not to be released to any third party unless written approval is given by those I authorize below.

The forwarding of this information to Facilitator is in conjunction with and subsequent to my signature approval of the Facilitator Non- Circumvent agreement.

---
Price Range:    $; 1-5 million, $$: 5-10 million, $$$: 10-15 million, $$$$: 15-20 million, $$$$$: 20+ million
Cap Rate:    A: All  B: 9+, C: 8+,  E: 7+, F: 6+
Property Types: SA -Stand Alone, NC - Neighborhood Center, CC– Community Center, RC– Regional Center, SR - Super Regional, SC - Shadow Center, GA- Grocery Anchored Center; DP-        Distressed Property, LC- Lifestyle Center, GAP - Garden Apartment, HAP High Rise Apartment.
Expense Responsibility: N-Net leased taxes Tenant paid, NN-Taxes & Insurance paid, NNN-Taxes,     Insurance, Repairs & Maintenance paid, Abs NNN– all expenses paid by tenant

---

Non-Confidential Property Brief Info:

Price Range: [  ]  Cap: [  ]  Prop Type: [  ]  Expense: [  ]  Region: [  ]

Confidential Property Info (Bound by Non-Disclosure):

Property Address: _____, State: _____, Zip:_____

Existing NOI: $_____, Percentage Occupancy: _____%, Historic Vacancy %_____

Property Size: _____# of Parking:_____.

Remarks: _____
_____

Contact name:_____ Phone: _____

Email: _____ Fax:_____

Person(s) authorized to release confidential information: _____
_____.

Brokerage: I _____ am a licensed Realtor in the state of _____ and have the above property listed for _____ %. I hereby register the above names Seller as my client and am willing to receive as compensation ½ the Facilitator facilitation fee less my commission amount.

I also would like to: _____ Purchase _____ Exchange. Please call: _____.

Email form to: assist1@service.net or Fax form to: 555-555-5555  Questions: service@service.net

* revocation: Seller agrees that Facilitator is due a full 4% fee is seller sells to a Facilitator listed Buyer any seller owned properties that seller engaged or rejected while seller's property was listed on Facilitator for a period of 24 months following sellers revocation of property on Facilitator.

FIG. 9.

Facilitator Acquisition Model Confidential Signup

I am forwarding the following information to Facilitator with the strict understanding that I may revoke* the enclosed information from the Facilitator's Website & System at any time. The following information is forwarded in two categories – confidential and non-confidential property brief information. The confidential information is not to be released to any third party unless written approval is given by those I authorize below.

The forwarding of this information to Facilitator is in conjunction with and subsequent to my signature approval of the Facilitator Non- Circumvent agreement.

```
Price Range:    $; 1-5 million, $$: 5-10 million, $$$: 10-15 million, $$$$: 15-20 million, $$$$$: 20+ million
Cap Rate:       A: All  B: 9+, C: 8+,  E: 7+, F: 6+
Property Types: SA -Stand Alone, NC - Neighborhood Center, CC– Community Center, RC– Regional   Center,   SR   -
Super Regional, SC - Shadow Center, GA- Grocery Anchored Center; DP-          Distressed   Property,   LC-   Lifestyle
Center, GAP - Garden Apartment, HAP High Rise Apartment.
Expense Responsibility: N-Net leased taxes Tenant paid, NN-Taxes & Insurance paid, NNN-Taxes,      Insurance,
Repairs & Maintenance paid, Abs NNN– all expenses paid by tenant
```

Non-Confidential Purchaser Brief Info:

Price Range: [    ]    Cap: [    ]    Prop Type: [    ]    Expense: [    ]    Region: [    ]

# of Properties bought last year: [    ]

Confidential Purchaser Info (Bound by Non-Disclosure):

Remarks: _____

_____.

Contact name:_____ Phone: _____

Email: _____ Fax:_____

Person(s) authorized to release confidential information: _____

_____.

Brokerage: I _____ am a licensed Realtor in the state of _____ and have the above property listed for ____ %. I hereby register the above named Buyer as my client and am willing to receive as compensation ½ the Facilitator facilitation fee less my commission amount.

I have also have property to: ____ Sell ____ Exchange Please call: _____.

Email form to: assist1@service.net or Fax form to: 555-555-5555 Questions: service@service.net

* revocation: Buyer agrees that Facilitator is due a full 4% fee is Buyer buys any a Facilitator listed properties for which that buyer was engaged or rejected while that property or other owned Sellers property was listed on Facilitator, for a period of 24 months following buyer's revocation of buyer information on Facilitator. Buyer additionally agrees that Buyer will pay Facilitator a 2% commission if buyer purchases and other seller owned properties in which buyer engaged or was engaged buy a Facilitator listed Seller for a period of one year after Buyer withdraws or revokes their buyer information from the Facilitator website/system.

FIG. 10.

Facilitator Service

SERVICE

*Have Nationwide Seller's Find You!*
BUYER CONFIDENTIAL SIGN UP
*It's Free!*

1031 Exchange
Exchange Properties

Contact Info:

Facilitator
(555) 555-5555
service@service.net

Assistant 1
(555) 555-5555
assist1@service.net

Assistant 2
(555) 555-5555
assist2@service.net

ACQUISITION ENTITIES

Price Range: $; 1-5 million, $$: 5-10 million, $$$: 10-15 million, $$$$: 15-20 million, $$$$$: 20+ million
Cap Rate: A: All  B: 9+, C: 8+, E: 7+, F: 6+
Property Types: SA -Stand Alone, NC - Neighborhood Center, CC– Community Center, RC– Regional Center, SR - Super Regional, SC - Shadow Center, GA- Grocery Anchored Center; DP- Distressed Property, LC- Lifestyle Center, GAP - Garden Apartment, HAP High Rise Apartment.
Expense Responsibility: N-Net leased taxes Tenant paid, NN-Taxes & Insurance paid, NNN-Taxes, Insurance, Repairs & Maintenance paid, Abs NNN– all expenses paid by tenant
Region: US- Full USA, SE - Southeast, SW - Southwest, NE - Northeast, NW– Northwest, C -Central, E- East, W-West, G - Global

| FACILITATOR SERVICE Program Explanation | View Nationwide Properties |

QUALIFIED - EXPERIENCED - REGISTERED PREMIER - BUYERS

Purchases L/Y: 1
Price Range: $$$$$
Region: US
Cap: A
Type: SR
Remarks:
*Contact Buyer*

Purchases L/Y: 6
Price Range: $$$ - $$$$
Region: US
Cap: B
Type: NC, SR, RC
Remarks: keep exist mgmt
*Contact Buyer*

Purchases L/Y: 7
Price Range: $ - $$
Region: SE
Cap: B
Type: CC, SA, GAP
Remarks:
*Contact Buyer*

Purchases L/Y: 3
Price Range: $ - $$$$
Region: US
Cap: A
Type: NC, SA, SR, RC,
Remarks:
*Contact Buyer*

ENGAGED

Purchases L/Y: 2
Price Range: $$ - $$$$
Region: SE
Cap: A
Type: RC, CC, SA
Remarks: aggressive, quick close
*Contact Buyer*

Non-Disclosure - Non-Circumvent - Confidentiality Agreement

FIG. 11.

1031 EXCHANGE SERVICE

PRE QUALIFIED - SCRUTINIZED - CONFIDENTIALLY AVAILABLE
QUALIFIED EXCHANGE PROPERTIES
READY FOR IDENTIFICATION
IN EXCESS OF $5 MILLION FOR PURCHASE OR EXCHANGE

Click on a Property below to process the Non-Disclosure Non-Circumvent Agreement.

UPON RECEIPT YOU WILL RECEIVE A PROPERTY SPECIFIC PASSWORD INCLUDING BUT LIMITED TO:
Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime

| Facilitator Service | 1031 CIREI Articles | National Intermediaries |
|---|---|---|
| Price: $$$$$<br>CAP: 6.8<br>State: TX<br>Type Life Style Center<br>Remarks: 1031 exchange property, all buyers must escrow 20% before a contract will be considered. | Price: $$<br>CAP: 8.7<br>State: AL<br>Type: Community<br>Remarks: *Outparcels included* | Price: SOLD<br>CAP: 10.1<br>State: AL<br>County: Baldwin<br>Type: Neighborhood<br>Remarks: |
| | Price: $$$<br>CAP: 8<br>State: AL<br>Type: Neighborhood<br>Remarks: *Hvy Retail Area great upside* | Price: SOLD<br>CAP: 9.25<br>State: AL<br>County: Birmingham<br>Type: Community<br>Remarks: Shadow Center |
| Price: $$$$<br>CAP: 7.25<br>State: NC<br>Type: Neighborhood Center<br>Remarks: 75% nationals | Price: SOLD<br>CAP: 7.25<br>State: AL<br>County: Birmingham<br>Type: Stand Alone<br>Remarks: 1031 | Price: $$$$<br>CAP: 7<br>State: GA<br>Type: Regional<br>Remarks: *Hvy Retail Area great upside* |

FIG. 17.

PROPERTY EXCHANGE PORTAL

Exchange Matrix

Exchange List

| Name | Status | Earliest ID Date | Latest Close Date | Next Deadline | |
|---|---|---|---|---|---|
| 2005 July | In Research | | | | Edit |
| 2005 October | Under Contract | 10/10/2005 | 12/31/2005 | 28 Days | Edit |

Exchange Details

| Name | Earliest ID Date | Earliest Close Date |
|---|---|---|
| Exchange 3 | 10/10/2005 | 12/31/2005 |

Properties I'm Selling

| RFE | Upstream 1031 | Select | Property Name | Selling Price | |
|---|---|---|---|---|---|
| ● | Y | View 1031 | ☑ | Leeds #1 | 15,500,000 | Remove |
| ● | N | | ☐ | Irondale Steel | $7,500,000 | Remove |
| | N | | | Leeds #2 | $6,500,000 | Remove |

List Total: $26,000,000
Selected Total: $15,500,000

[Add More Properties]

Properties I'm Buying or Want to Buy

| Property Type | Price | Cap Rate | Region | Expense Offset | Status | | Select | |
|---|---|---|---|---|---|---|---|---|
| GAP | $2,000 | B | NE | N | In Negotiation | Details | ☑ | Remove |
| NC | $7,000 | A | NW | NN | RFE | Details | ☑ | Remove |
| NC | $3,000 | B | SE | N | Under Contract | Details | ☑ | Remove |
| NC | $$ | B | NE | NN | Available | View Price | ☐ | Remove |

Selected Total: $12,000,000
Difference: $3,500,000

[Execute Exchange] [Save] [Delete]

Search for Properties to Buy

| Property Type | Price Range | Cap Rate |
|---|---|---|
| [Not selected] | [Not selected] | [Not selected] |

| Region | Expense Offset | |
|---|---|---|
| [Not selected] | [Not selected] | [RUSearch] |

Search Results

| Property Type | Price Range | Cap Rate | Region | Expense Offset | |
|---|---|---|---|---|---|
| GAP | $$ | C | NE | N | Add to Buy List |
| NC | $$$ | A | W | NNN | Add to Buy List |

FIG. 19.

FACILITATOR SERVICE

A Powerful Industry Exclusive

A Valuable <u>New</u> Owner Protection Tool:

TENANT DEFAULT INCOME INSURANCE!
Up to 36 month Secured Acquisition NOI
Offered Exclusively by Facilitator.

NO Charge
to Buyers and Sellers.

When a registered Buyer purchases a Facilitator marketed property they you receive a free Title Policy and a Free Tenant Default Income Insured Protection Plan at closing that affords you piece of mind guaranteeing your leasehold income for up to three years.

During your initial period of ownership, while you are becoming intimately familiar with your new asset, Facilitator steps up and assures you of your income and will work hard to refill your vacancy as we are paying the rent on the vacant space for up to one year any time during your first 24 months of ownership.

Available Properties   Buyer Qualifications

Acquisition Entity Sign Up

FIG. 20.

SYSTEM, METHOD AND COMPUTER PROGRAM PRODUCT FOR FACILITATING A REAL ESTATE EXCHANGE

CROSS-REFERENCE TO RELATED APPLICATIONS

The present application claims priority from U.S. Provisional Patent Application No. 60/747,352, entitled: System, Method and Computer Program Product for Facilitating Real Estate Transactions, filed May 16, 2006; and is a continuation-in-part of U.S. patent application Ser. No. 10/890,548, entitled: System, Method and Computer Program Product for Facilitating Real Estate Transactions, filed Jul. 13, 2004 now U.S. Pat. No. 7,152,037, which claims priority from U.S. Provisional Patent Application No. 60/565,554, entitled: System, Method and Computer Program Product for Facilitating Real Estate Transactions, filed on Apr. 27, 2004, the contents of all of which are incorporated herein by reference in their entireties.

FIELD OF THE INVENTION

The present invention generally relates to systems and methods for facilitating the exchange of real estate and, more particularly, to systems, methods and computer program products for facilitating the exchange of commercial real estate properties.

BACKGROUND OF THE INVENTION

In the commercial real estate industry, potential sellers of commercial real estate often avoid publicly advertising or listing their real estate, and potential sellers and buyers are often very cautious about selling or purchasing commercial real estate that has single or multiple existing tenants. Potential sellers often fear that existing tenants of affected properties will look to lease space elsewhere, and/or that potential tenants will avoid leasing space within the affected properties. Potential buyers, on the other hand, are typically reluctant to purchase property due to the risk of default of tenants leasing space within the property.

In addition, potential sellers typically prefer to not be "shopped" by competitors, or felt out by numerous developers and/or potential buyers. Further, potential sellers typically prefer to not be limited by listing agreements or agency relationships that bind the potential sellers to a single brokerage firm or an unnecessary agency liability for a specific duration. And as a result of potential sellers avoiding public advertising or listing of their properties, in various segments of commercial real estate, the demand of available potential buyers may significantly outnumber the supply of known, publicly available properties. However, this generally does not reflect the fact that the demand of available potential buyers significantly outnumbers the supply of properties available for purchase, only that a significant number of available properties may not be publicly available, and thus known to potential buyers.

In another facet of the commercial real estate industry, which is also typically applicable to the real estate industry in general, consider an institutional buyer of real state such as a pension fund manager who owns or otherwise controls two-hundred properties. Also consider that the manager desires to sell twenty of those properties and buy thirty new properties, such as by effectuating a tax deferred exchange under U.S. Internal Revenue Code section 1031 (often referred to as a Internal Revenue Service (IRS) 1031 tax deferred exchange). In such an instance, the manager may effectuate the tax deferred exchange in accordance with the following typical scenario. First, the manager contacts a number of prospective realtors in each of the plurality of cities within which the twenty properties to sell are located. The manager interviews the prospective realtors and selects at least two realtors in each city to submit marketing plans. After reviewing the marketing plans, the manager meets with the selected realtors in each city to negotiate listing fees and listing contracts proposed by the selected realtors. The manager then selects a realtor in each city and meets with the realtor to sign the listing contract and agree upon the frequency and method for any subsequent review and modification of the respective realtor's marketing plan. As will be appreciated, the manager is now between thirty and a hundred or more meetings and several weeks or months into the property sale portion of the exchange.

Twelve of the twenty properties go under contract to one or more buyers some months after those properties are listed for sale, and the manager now proceeds down a similar path for selecting and engaging one or more realtors to locate suitable properties to buy for the property purchase portion of the exchange. In the meantime, the manager searches for suitable properties on his/her own. In this regard, the manager's search includes sifting through a myriad of information that is often incomplete, incorrect or misrepresented, typically only netting ten suitable properties for every hundred properties researched. The manager selects a number of suitable properties for attempted purchase. In attempting to engage the suitable properties for purchase, however, the manager learns that a number of the properties have other potential buyers who are also attempting to engage those properties, often for the same reasons as the manager, further complicating their purchase. The net result of the steps taken by the manager is effectuation of a tax deferred exchange that requires an excessive amount of time and resources. Moreover, timing restrictions that may exist with respect to the property sale and property purchase portions of the exchange may increase stress, liability and the potential for litigation.

SUMMARY OF THE INVENTION

In light of the foregoing background, exemplary embodiments of the present invention provide an improved system, method and computer program product for facilitating real estate exchanges. The system, method and computer program product of embodiments of the present invention are capable of permitting an exchangor to readily initiate a real estate exchange regarding properties of the exchangor, and properties of sellers. Advantageously, the system, method and computer program product permit the exchangor to identify properties of the exchangor and the sellers such that information associated with those properties can be provided from a database to parties that may have an interest in purchasing those properties. Information regarding properties identified for the sale portion of the exchange can therefore be provided from the database to buyers interested in purchasing those properties from the exchangor. Similarly, information regarding properties identified for the purchase portion of the exchange can be provided from the database to the exchangor, the exchangor being interested in purchasing those properties from the sellers. Accordingly, embodiments of the present invention permit streamlining of the process to effectuate a real estate exchange, reducing the number of required steps as well as the time required to effectuate the exchange. Further, embodiments of the present invention also permit engaging the exchangor in communication with respective buyers and sellers in a manner without uninvited outside interference to facilitate the buyers and sellers concluding an exchange transaction. And since buyers are typically reluctant to purchase property due to the risk of default of tenants leasing space within the property, the system, method and computer program product of embodiments of the present invention may also provide, for a period of time, insurance to the buyer against loss of income due to default of the existing tenants of the property, should a buyer and seller conclude the purchase/sale of a property.

According to one aspect of the present invention, a method is provided for facilitating a real estate exchange, the exchange including a sale portion and a purchase portion. In accordance with the method of this aspect, one or more properties of an exchangor are identified for the sale portion of the exchange, as are one or more properties of one or more sellers for the purchase portion of the exchange. In this regard, the properties of the exchangor and the sellers have associated property information stored in a property database of the facilitator arrangement, where at least a portion of the property information may include access-restricted information. The method also includes engaging the properties for the sale and purchase portions of the exchange to thereby facilitate the exchange. More particularly, engaging the properties includes providing a buyer with at least a portion of the property information associated with one or more properties identified for the sale portion of the exchange. Similarly, the exchangor can be provided with at least a portion of the property information associated with one or more properties identified for the purchase portion of the exchange. When the information includes access restricted information, however, the method can further include receiving an executed agreement from the buyer before providing the buyer with the access-restricted information, and/or receiving an executed agreement from the exchangor before providing the exchangor with the access-restricted information.

To facilitate a desired or otherwise required exchange, the method can further include calculating a running comparison of the total sale price of the properties for the sale portion and the total purchase price of the properties for the purchase portion, where the running comparison can be calculated as the properties are identified. A determination can then be made as to whether a predetermined relationship between the total sale price and total purchase price (e.g., total purchase price at least the total sale price) is met based upon the running comparison. If the predetermined relationship isn't met, then, the properties identified for the sale portion and/or the purchase portion of the exchange can be adjusted until the predetermined relationship is met. In this regard, one or more properties identified for the sale portion of the exchange can be removed. Additionally or alternatively, one or more additional properties can be identified for the purchase portion of the exchange.

If so desired, engaging the properties can further include engaging the exchangor and the buyer and/or seller for an engagement period, where the respective parties can be engaged regarding property of the exchangor identified for the sale portion of the exchange, and/or property of the seller identified for the purchase portion of the exchange. In such instances, the engaged exchangor and buyer/seller can be restricted from communicating with other buyers or sellers regarding the respective properties during the engagement period.

Also, in various instances one or more properties identified may comprise income-producing properties that each has one or more tenants. In such instances, the method may further include insuring the exchangor and/or buyer for a period of time against a loss of income due to a default of at least one tenant of one or more respective properties. In this regard, insuring the exchangor/buyer can include insuring the exchangor if the exchangor concludes a real estate transaction regarding an income-producing property identified during the purchase portion of the exchange. Additionally or alternatively, insuring the exchangor/buyer can include insuring the buyer if the exchangor concludes a real estate transaction regarding an income-producing property identified during the sale portion of the exchange.

According to other aspects of the present invention, a system and computer program product are provided for facilitating a real estate exchange. Therefore, embodiments of the present invention provide an improved system, method and computer program product for facilitating a real estate exchange. As indicated above and explained in greater detail below, the system, method and computer program product of exemplary embodiments of the present invention may solve the problems identified by prior techniques and may provide additional advantages.

BRIEF DESCRIPTION OF THE DRAWINGS

Figure 1:
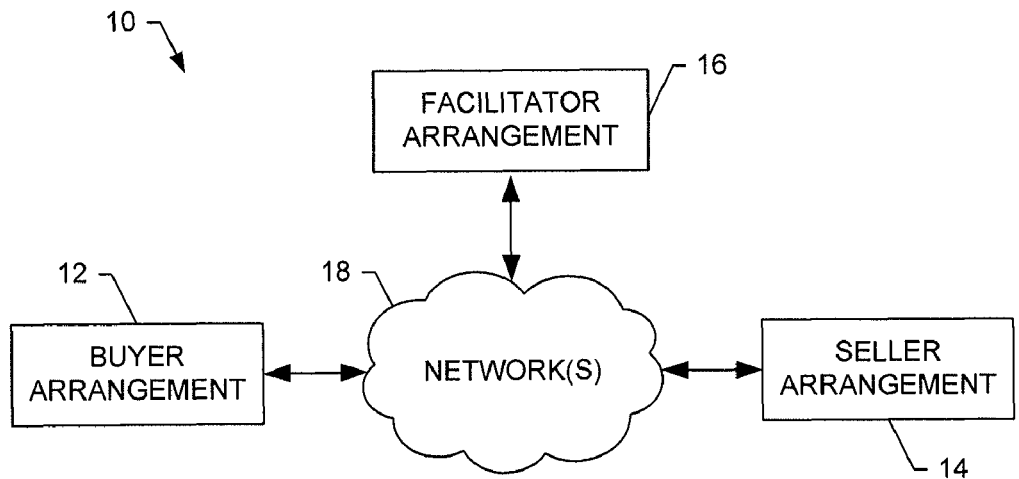
Figure 2:
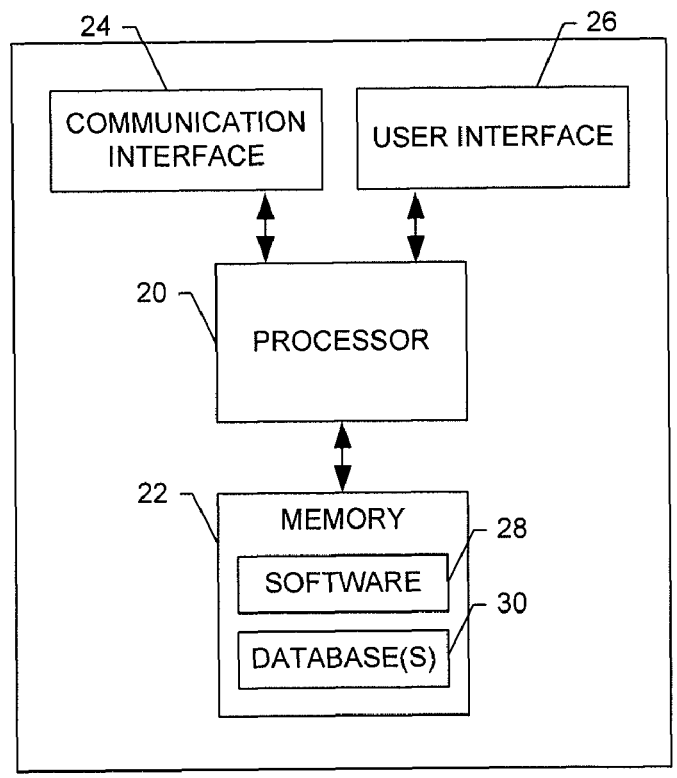
Figure 3A:
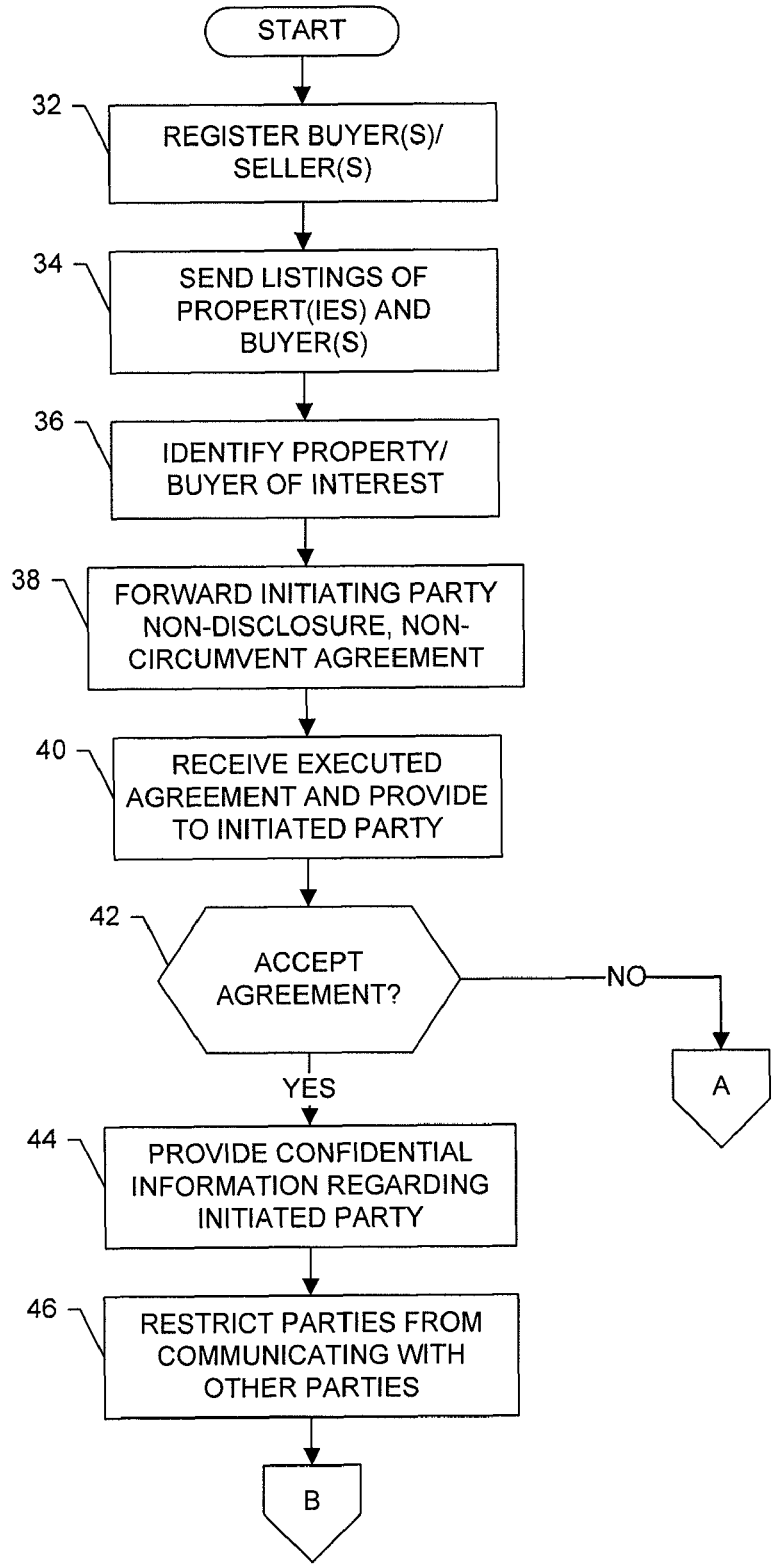
Figure 3B:
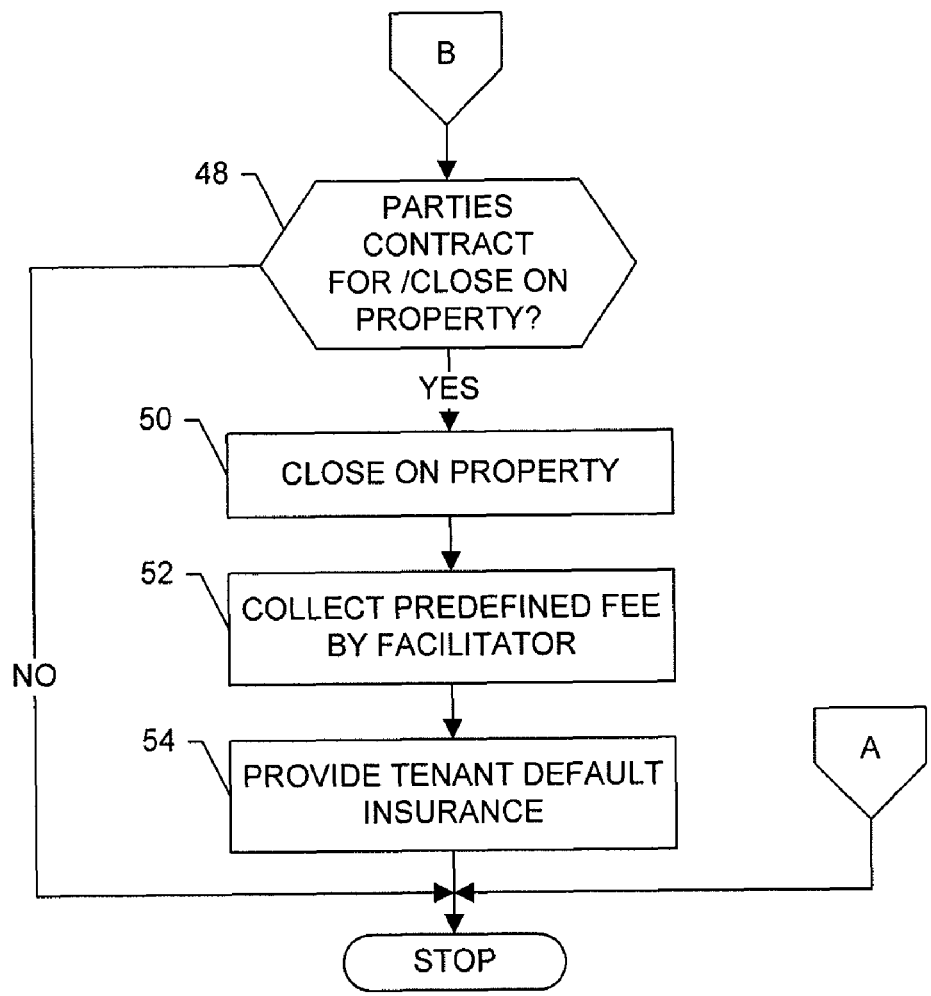
Figure 4:
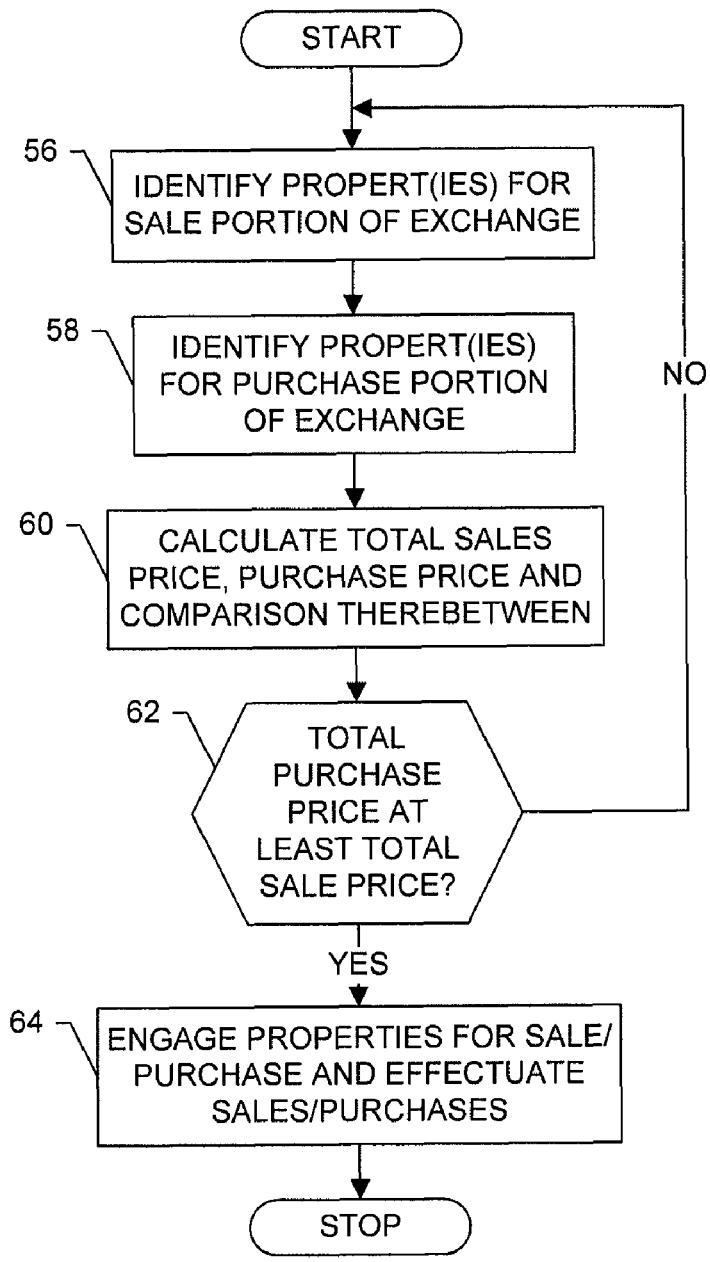

Having thus described the invention in general terms, reference will now be made to the accompanying drawings, which are not necessarily drawn to scale, and wherein:

FIG. 1 is a schematic block diagram of a system for facilitating real estate transactions in accordance with exemplary embodiments of the present invention;

FIG. 2 is a schematic block diagram of an entity capable of operating as a buyer, seller and/or facilitator, in accordance with exemplary embodiments of the present invention;

FIGS. 3A and 3B are flowcharts illustrating various steps in a method of facilitating a real estate transaction in accordance with an exemplary embodiment of the present invention;

FIG. 4 is a flowchart illustrating various steps in a method of insuring the owner or leaseholder of income-producing property against the default of one or more tenants of such property, in accordance with an exemplary embodiment of the present invention; and FIGS. 5-20 illustrate exemplary displays capable of being provided by a facilitator arrangement to buyer arrangements and seller arrangements, in accordance with embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for facilitating real estate transactions includes one or more buyer arrangements 12, seller arrangements 14 and facilitator arrangements 16 (one of each being shown). Each buyer arrangement is capable of directly and/or indirectly communicating with one or more seller arrangements and facilitator arrangements. Similarly, each seller arrangement is capable of directly and/or indirectly communicating with one or more buyer arrangements and facilitator arrangements; and each facilitator arrangement is capable of directly and/or indirectly communicating with one or more buyer arrangements and seller arrangements. In this regard, the buyer, seller and facilitator arrangements can be capable of directly and/or indirectly communicating with one another across one or more networks 18. The network(s) can comprise any of a number of different combinations of one or more different types of networks. For example, the network(s) can include one or more data networks, such as a local area network (LAN), a metropolitan area network (MAN), and/or a wide area network (WAN) (e.g., Internet), and include one or more wireline and/or wireless voice networks, including a wireline network such as a public-switched telephone network (PSTN), and/or wireless networks such as IS-136 (TDMA), GSM, and/or IS-95 (CDMA). For purposes of illustration, however, as described below, the network comprises the Internet (i.e., WAN) unless otherwise noted.

The buyer arrangement 12, seller arrangement 14 and facilitator arrangement 16 can comprise any one or more of a number of different entities, devices or the like capable of operating in accordance with exemplary embodiments of the present invention. In this regard, one or more of the buyer arrangement, seller arrangement and facilitator arrangement can comprise, include or be embodied in one or more processing elements, such as one or more of a laptop computer, desktop computer, server computer or the like. Additionally or alternatively, one or more of the buyer arrangement, seller arrangement and facilitator arrangement can comprise, include or be embodied in one or more portable electronic devices, such as one or more of a mobile telephone, portable digital assistant (PDA), pager or the like. For example, the buyer arrangement, seller arrangement and facilitator arrangement can each comprise a processing element capable of communicating with one another across the Internet (e.g., network 18).

It should be understood, however, that one or more of the buyer arrangement 12, seller arrangement 14 and facilitator arrangement 16 can comprise or otherwise be associated with a user carrying out the functions of the respective entity. For example, the buyer arrangement can comprise a buyer or buyer agent (representing a buyer) communicating across a PSTN (e.g., network 18), by mail or in person with a seller operating a seller processing element, where the seller and processing element collectively comprise the seller arrangement. In such instances, the facilitator arrangement can comprise a facilitator processing element communicating across the Internet with the seller processing element. Alternatively, in such instances, the facilitator can comprise a facilitator operating a facilitator processing element, where the facilitator is capable of communicating with the seller across a PSTN. As explained below, then, the term "buyer arrangement" can refer to a buyer and/or buyer processor. Similarly, the term "seller arrangement" can refer to a seller and/or seller processor; and the term "facilitator arrangement" can refer to a facilitator and/or facilitator processor.

Referring now to FIG. 2, a block diagram of an entity capable of operating as a buyer arrangement 10, seller arrangement 14 and/or facilitator arrangement 16 is shown in accordance with one exemplary embodiment of the present invention. Although shown as separate entities, in some exemplary embodiments, one or more entities may support one or more of a buyer arrangement, seller arrangement and/or facilitator arrangement, logically separated but co-located within the entit(ies). For example, a single entity may support a logically separate, but co-located, buyer arrangement and facilitator arrangement. Also, for example, a single entity may support a logically separate, but co-located seller arrangement and facilitator arrangement. As shown, the entity capable of operating as a buyer arrangement 12, seller arrangement 14 and/or facilitator arrangement 16 can generally include a processor 20 connected to a memory 22. The processor can also be connected to at least one communication interface 24 or other means for transmitting and/or receiving data, content or the like. The processor can additionally be connected to a user interface 26 that can include a display and a user input interface. The user input interface, in turn, can comprise any of a number of devices allowing the entity to receive data from a user, such as a keypad, a touch display (not shown) or other input device.

The memory 30 can comprise volatile and/or non-volatile memory, and typically stores content, data or the like. In this regard, the memory typically stores software applications 28, instructions or the like for the processor to perform steps associated with operation of the entity in accordance with exemplary embodiments of the present invention. For example, the memory can store software applications such as one or more connectivity applications (e.g., Web browser, etc.). Also, when the entity comprises a facilitator arrangement 16, the memory can store one or more databases 38, such as a buyer database and a property database. The buyer database can store information relating to buyers registered with the service offered by the facilitator arrangement, and the property database can store information relating to sellers and associated properties that are registered with the service. As explained herein, buyers and sellers may individually or collectively be referred to as participants of the service offered by the facilitator arrangement. And while the associated properties may be concurrently listed with the facilitator arrangement service and one or more other services, such as the Multiple Listing Service (MLS), in one exemplary embodiment of the present invention, the associated properties are listed with the facilitator arrangement service in lieu of a listing with other services.

In accordance with exemplary embodiments of the present invention, the facilitator arrangement 16 is capable of offering a real estate information exchange service to one or more buyer arrangements 12 and seller arrangements 14. Generally, the service provides a medium for buyers and sellers to communicate with one another without outside interference to facilitate the respective arrangements concluding a real estate sales or exchange transaction. And since buyers are typically reluctant to purchase property due to the risk of default of tenants leasing space within the property, if so desired, the service can also provide, for a period of time, insurance to the buyer against loss of income due to default of the existing tenants of the property, should a buyer and seller conclude the purchase/sale of a property. As described herein, such insurance may be referred to as "tenant default insurance."

Reference is now made to FIGS. 3A and 3B, which illustrates various steps in a method of facilitating a real estate transaction, in accordance with one exemplary embodiment of the present invention. As shown in block 32, the method can include the one or more buyers and sellers of the buyer arrangements 12 and seller arrangements 14, respectively, registering with the facilitator arrangement 16, or more particularly with the service offered by the facilitator arrangement. Advantageously for the sellers, during the registration process of the buyers, information regarding the buyers can be generated, gathered or otherwise received by the facilitator arrangement. For example, the facilitator arrangement can gather information regarding the type of buyer (e.g., cash, joint venture, exchange, etc.), property purchases made by the buyer arrangements over a previous period of time (e.g., previous 12-24 months). The facilitator arrangement can then evaluate such buyer information to determine if the buyer information is accurate to thereby determine if the buyers are legitimate. For example, the facilitator arrangement can evaluate information regarding property purchases made by the buyer to determine the nature of the financing used to purchase the properties (e.g., all cash, mortgage, owner financing, equity trade, etc.). In addition, the facilitator arrangement can evaluate the buyer information to determine if the buyers are qualified to purchase an indicated level of real estate. In this regard, if the facilitator arrangement fails to determine that the buyers are legitimate and qualified, the facilitator arrangement can refuse to register the respective buyers. Otherwise, the facilitator arrangement can register the buyers with the service offered by the facilitator arrangement.

For the buyers, information regarding the properties of the sellers and/or the sellers themselves can be generated, gathered or otherwise received by the facilitator arrangement 16. The facilitator arrangement can then evaluate such seller information to allow the facilitator arrangement to provide data related to the properties. For example, the facilitator can receive and thereafter evaluate or otherwise confirm seller information including blueprints, aerial photos, zoning, certificates of occupancy, various regulatory approval letters, rent rolls, parking ratios, setbacks, surveys, inspections, NOI's (net operating incomes), cap (capitalization) rates, financing packages, cash on cash projections, cash flow projections, comparables by radius, competition reports with tenant mix and local trend reports, as well as property specific mapping of income, population, consumer expenditure, retail sales and crime statistics.

In addition to the foregoing, the facilitator arrangement can receive, from one or more of the participants (e.g., one or more buyers and sellers of the buyer arrangements 12 and seller arrangements 14), information regarding the supply of properties owned by the participants, as well as the demand (and/or anticipated demand) for properties by the participants. In this regard, the participants may provide, to the facilitator arrangement, their asset base of properties including asset base criteria regarding those properties such as, for example, property type, region, price range and/or quantity. Additionally or alternatively, participants may provide their acquisition criteria for a current time period (e.g., year) and/or one or more future time periods, where the acquisition criteria identifies criteria for properties the respective participants anticipate purchasing during the respective time period(s). Similarly, additionally or alternatively, participants and sellers may provide their disposition criteria for a current time period (e.g., year) and/or one or more future time periods, where the disposition criteria identifies criteria for properties the respective participants anticipate selling during the respective time period(s). The acquisition criteria and disposition criteria can be provided in any of a number of different manners, such as by performing searches of buyer arrangements and/or properties in the buyer database and/or property database (i.e., databases 38). The acquisition and disposition criteria can include any of a number of different criteria, and may be the same or different. In one exemplary embodiment, for example, the acquisition and disposition criteria are the same and may include one or more of property type, region, price range, cap rate and/or quantity. Additional information such as percentage occupancy, percentage of national tenancy, average lease terms remaining, location may be defined by address, MSA (metropolitan statistical area) or market size and demographic variables may be coded or entered as searchable field data enabling the searcher to broaden or narrow their search, alignment or correlation of the acquisition and disposition criteria.

After providing such information regarding an asset base, the facilitator arrangement 16 can provide, to the participants, real-time information regarding the number of properties in the asset bases of other participants having matching asset base criteria with those properties in the respective participants asset bases (supply). For example, a participant with an asset base including a property with certain asset base criteria may receive real-time information regarding the number of properties in the asset bases of other participants that match that certain asset base criteria. In addition, the facilitator arrangement can provide the participants with real-time information regarding the number of properties having acquisition criteria (other participants anticipate purchasing) matching the asset base criteria with properties in the respective participants'asset bases (demand), and/or real-time information regarding the number of properties having acquisition criteria matching the disposition criteria of the respective participants. For example, a participant with an asset base including a property with certain asset base criteria may receive real-time information regarding the number of properties (other participants anticipate purchasing) having acquisition criteria that match that certain asset base criteria.

In addition, the facilitator arrangement 16 can provide, to the participants, a forecast of industry projected purchases and/or sales based on total aggregation of the participants'acquisition criteria and/or disposition criteria, and/or the number of properties having those respective criteria. Such information may be used, for example, as a rule of thumb for entities such as pension funds to make funds available for institutional buyers. This aggregated information may forecast performance for a particular time period (e.g., year). The properties including particular asset base criteria in the asset bases of the participants may show immediate real-time supply for properties with the same asset base criteria, and active searches by participants for properties including particular acquisition criteria may show immediate real-time demand for properties with the same acquisition criteria.

As will be appreciated, the supply and/or demand may be further broken down to provide information as to the number of matching properties in the collective asset bases of, and/or those having matching acquisition criteria for, all of the participants. This breakdown may be respectively referred to as "industry" or "current" supply and "industry" or "current" demand. In addition or in the alternative, the supply and/or demand may be broken down to provide information as to the number of matching properties in the collective asset bases, and/or those having matching acquisition criteria, in a "hold" state, in a "for sale" state and/or in either a "hold" state or a "for sale" state (the respective states being explained in greater detail below), and/or the number of historical sales of properties of the participants. The matching collective properties in the asset bases that are in the "for sale" state may be referred to as "facilitator supply," and the properties that are in either the "hold" state or the "for sale" state that have matching acquisition criteria may be referred to as "facilitator demand." The number of instances of matching properties and/or matching acquisition criteria, then, may be presented adjacent to in a manner otherwise associated with the respective properties of the participants in the respective states. Thus, with this information, buyers and sellers are apprised, in real time, of the supply of, and demand for, properties similar to the properties in their asset bases (as identified by the respective criteria).

Once in the asset base or any of the states within which a property may be placed (e.g., "hold" state, "for sale" state, etc.—explained below), the respective participant can adjust one or more criteria related to the property (e.g., reduce the cap rate), such as to measure demand for the property with different criteria. The participant can therefore determine a real-time value of the property based on the real-time demand for the property with specific criteria (e.g., at a specific price). More particularly, for example, consider a participant with an asset base including a property with certain asset base criteria, including a certain cap rate. In this regard, the cap rate may be searched or assessed by viewing additional criteria such as percentage occupancy, average remaining lease terms, market size, or certain demographic variables, for example. Also consider that the buyer database includes a particular number of buyer arrangements 12 with acquisition criteria matching the asset base criteria of the respective, thereby providing "facilitator demand" for that property. In such instances, the participant may adjust one or more asset base criteria of the property, such as by adjusting the cap rate. In response, the service of the facilitator arrangement 16 may adjust the "facilitator demand" to now reflect the number of buyer arrangements with acquisition criteria matching the adjusted acquisition criteria. The participant may adjust the asset base criteria of the property at one or more instances. Accordingly, the participant may perform a real-time valuation of the property by identifying the number of interested buyers (those with matching acquisition criteria) for the property with different asset base criteria values.

As information regarding properties of the sellers is generated, gathered or otherwise received, the respective sellers or seller arrangements 14 may designate their properties as being in one of a number of different states, such as in a "hold" state or "for sale" state. In this regard, properties in the "for sale" state may be listed by the facilitator arrangement as being properties available for engagement in a real estate transaction, such as a real estate sale or exchange. Properties in the "hold" state, on the other hand, may be evaluated by the facilitator arrangement 16, but not otherwise listed as being available for engagement. At such time that the respective seller arrangement desires to list a held property for sale, the seller arrangement may merely move the property from the "hold" state to the "for sale" state, with the property already having been evaluated. Properties in the "hold" and/or "for sale" states may indicate, in real time, the number of buyers interested in similar properties (as identified by, e.g., matching asset base and acquisition criteria), and if so desired, also identify the types of interested buyers, such as cash, joint venture or exchange-type buyers (identified based on buyer information). Accordingly, the facilitator arrangement may triggered to notify buyer arrangements 12 of "for sale" properties as the respective seller arrangements change the state of those properties from "hold" to "for sale," as explained below.

Before, after or as the facilitator arrangement 16 evaluates the buyer information or seller information, the facilitator arrangement can create an entry for the buyer or the seller in the buyer database or property database. Also, in accordance with the service provided by the facilitator arrangement, the facilitator arrangement can send the buyer arrangements 12 details of the for-sale properties of sellers stored in the property database (i.e., properties in a for-sale state), and send the seller arrangements 14 details of buyers stored in the buyer database (i.e., buyers available for purchasing one or more properties), as shown in block 34. In this regard, the details of properties and buyers can be sent to the buyer arrangements and seller arrangements, respectively, in any of a number of different manners. For example, upon registering with the service provided by the facilitator arrangement, the facilitator arrangement can send the buyer and seller arrangements currently active property and buyer details maintained in the property and buyer databases. Thereafter, as properties or buyers of interest to the buyer arrangements or seller arrangements are made available, such as by being entered into a respective database, the buyer arrangements or seller arrangements may receive a real-time availability alert notifying the respective arrangements of the newly available properties or buyers. The availability alert can be received in any of a number of different manners, such as by email, short message service (SMS), notification on a Web portal of the service or the like.

The real-time availability alert may also be filtered to limit its recipients. For example, the availability alert may be filtered by the sender so that only certain receivers may receive the alert. Also, for example, the availability alert may be filtered so that only principals can receive the alert followed by brokers a period of time later. Further, for example, the availability alert may be filtered so that only certain company types or companies of a certain size, or companies having a certain historical purchasing pattern, receive the alert.

As indicated above, properties may be maintained in the property database of the facilitator arrangement 16 in a hold state whereby the respective properties are not indicated as being available for engagement in a real estate transaction (it should be understood, however, that the foregoing may be equally applicable to buyers maintained in the buyer database). Properties in the hold state, however, have a number of characteristics viewable to the respective seller arrangement including, for example, the property type, cap, and region. In addition, properties in the hold state may also have associated therewith, and viewable to the respective seller arrangement, information such as the number of potential buyers (e.g., cash, exchange or joint-venture buyers) interested in purchasing properties having one or more characteristics of the respective properties. The seller arrangements 14 of the held properties or buyers may maintain the respective held properties until such time as the seller arrangements desire to make their properties available for engagement in a real estate transaction. The respective seller arrangement can then indicate their desire by moving the held property or buyer from a hold state to a for-sale state. In response to a property being moved from a hold state to a for-sale state (or otherwise being added to the respective database), the facilitator arrangement can then, in real-time or otherwise, send availability alerts to the buyer arrangements to thereby notify the buyer arrangements of the newly available property. As will be appreciated, the hold state not only permits the seller arrangement to take a property from being totally confidential to for-sale, but may also permit the seller arrangement to take a property from being totally confidential to an "engaged" state (and even have an upstream buyer in-hand for an exchange) without the respective property ever having been placed in the for-sale state.

Properties can be made available to the marketplace in varied states of exposure, such as totally or partially confidential, fully publicly-identified, or the like. For example, properties may be made partially confidential by allowing only certain possible responders (buyers) to see limited information about the property. In this regard, a seller arrangement 14 can direct the facilitator arrangement 16 to only send out an availability alert only to certain buyer arrangements 12. These buyer arrangements may include, for example, public REITs who have assets of at least one billion dollars, have purchased this type of asset in the past. Along with directing availability alerts only to certain buyer arrangements, the seller arrangement may additionally or alternatively direct the facilitator arrangement to permit buyer arrangements to see additional property criteria such as for example, MSA or city, or perhaps the exact address.

Irrespective of how or when the buyer arrangements 12 and seller arrangements 14 receive details of properties and buyers, the details can include any of a number of different pieces of seller information and buyer information, respectively. In one exemplary embodiment, for example, the details of properties and buyers include a portion of the seller and buyer information sufficient to allow the buyers and sellers to gauge an interest in one or more properties of the sellers or one or more buyers, respectively. To facilitate the buyers and sellers engaging the service of the facilitator arrangement 16, however, the details may not include information sufficient to permit the buyers or sellers to contact one another independent of the service.

After receiving the respective details at the buyer arrangements 12 and seller arrangements 14, the buyers can identify properties of interest, and the sellers can identify buyer arrangements of interest, as shown in block 36. If either a buyer or seller (i.e., the initiating party) desires to contact a seller or buyer (i.e., the initiated party), directly or as a result of actions of the facilitator arrangement, the facilitator arrangement can forward the initiating party arrangement a non-disclosure, non-circumvent facilitation fee agreement in which the initiating party agrees to pay the facilitator arrangement a predefined fee for the service provided by the facilitator arrangement should the initiating party and initiated party conclude a real estate transaction with one another, as shown in block 38.

After the initiating party (i.e., buyer or seller) executes the non-disclosure, non-circumvent facilitation agreement, and the initiating party arrangement (i.e., buyer arrangement 12 or seller arrangement 14) returns the executed agreement to the facilitator arrangement 16, the facilitator arrangement can forward the agreement to the initiated party arrangement (i.e., seller arrangement or buyer arrangement) for acceptance by the initiated party (i.e., buyer or seller), as shown in block 40. Provided the initiated party accepts the agreement (see block 42), the facilitator arrangement can provide, to the initiating party arrangement, confidential, access-restricted information related to the initiated party, as shown in block 44. The confidential information can be provided in any of a number of different manners, such as by forwarding the initiating party arrangement a password permitting the initiating party arrangement to access the confidential information. For example, the facilitator arrangement can permit a buyer arrangement to access confidential information comprising one or more pieces of seller information regarding the seller and/or the seller's property of interest to the buyer arrangement. The access-restricted seller information and buyer information can include any of a number of different pieces of information, including contact information for the seller and buyer, and one or more of the pieces of seller information and buyer information indicated above. However, at least a portion of the confidential information typically comprises information not having been included in the details previously sent to the buyer arrangement and seller arrangement (see block 34).

Irrespective of the confidential information provided to the initiating party arrangement, after the parties are engaged with respect to a particular property, the property can be moved into an "engaged" state, or be further associated with such a state (e.g., in addition to the for-sale state). Also, once the initiating and initiated parties are engaged in communication, the parties can be restricted from contacting other parties (i.e., other sellers and buyers) for a predefined engagement period (e.g., twenty-one days), which may or may not be extendible (e.g., mutually extendible). In this regard, the parties can be considered engaged in communication in any of a number of different manners. For example, the parties can be considered engaged in communication once the initiated party accepts the non-disclosure, non-circumvent agreement, or once the initiated party receives the password or uses the password to access information related to the initiated party, as shown in block 46. Irrespective of when the parties are considered engaged in communication, during the engagement period, the buyer can be restricted from communicating with other sellers regarding other properties. Likewise, the seller can be restricted from communicating with other buyers regarding the same property during the engagement period. The parties can be restricted from communicating with other parties in any of a number of different manners. For example, the facilitator can contractually restrict the parties from communicating with other parties. Additionally or alternatively, for example, the facilitator arrangement can remove, or otherwise restrict access to, the parties from the details of properties and buyers sent to other buyer arrangements 12 and seller arrangements 14 (see block 34). Advantageously, restricting each party from communicating with other parties during the engagement period can facilitate the parties concluding a real estate transaction with one another without outside interference.

If so desired, a seller arrangement 14 can further decide to allow multiple engagements (buyer arrangements 14), such as in the form of permitting multiple engagees to "bid" on the property at the end of an engagement period. In this scenario, the multiple engagees may have time and the exclusive right to pursue this property during the engagement period. This allows the buyer arrangements to align their acquisition criteria with a larger more eligible supply of properties.

After the initiating and initiated parties are engaged in communication, the parties may desire to conclude a real estate transaction regarding a property of the seller. In such an instance, the parties can conclude the real estate transaction in any of a number of different manners, such as by entering into a sales contract regarding a respective property and closing on the respective property, shown in block 48. In such instances, the facilitator can operate outside the transaction, or alternatively function as a broker for the transaction. In another alternative, the facilitator can engage a broker, closing agent or other facilitator for the transaction, with the facilitator and the engaged party entering into a separate agreement related to the brokering of the transaction. In either event, at the conclusion of the transaction, such as during closing of the property, the facilitator can collect the predefined fee from the initiating party for the service provided by the facilitator, as shown in blocks 50 and 52. Also at the conclusion of the transaction, if so desired and previously offered by the facilitator, the facilitator can provide the buyer with a limited duration tenant default insurance policy, as shown in block 54. For more information on such tenant default insurance, see U.S. patent application Ser. No. 10/890,457, entitled: System and Method for Insuring an Entity against Tenant Default with Respect to an Income-Producing Property, filed Jul. 13, 2004, the content of which is hereby incorporated by reference in its entirety.

In accordance with another, more particular exemplary embodiment of the present invention, a method is provided for facilitating a real estate exchange. Similar to before, the method can include registering buyer(s) and seller(s) of the buyer arrangements 12 and seller arrangements 14, respectively, with the facilitator arrangement 16, or more particularly with the service offered by the facilitator arrangement (see FIG. 3A, block 32). In accordance with this exemplary embodiment, an arrangement functioning as both a buyer arrangement and a seller arrangement to effectuate a real estate exchange may be referred to as an exchangor arrangement. Also similar to before, then, the method can include the facilitator arrangement generating, gathering or otherwise receiving, from the exchangor arrangement, information regarding the properties of the exchangor arrangement (seller arrangement for the sales portion of the exchange). As information regarding the exchangor's properties is received, the exchangor arrangement may designate the properties as being in one of a number of different states, such as in a "hold" state or "for sale" state, as indicated above.

Further, similar to before, the facilitator arrangement 16 can send the exchangor arrangement (buyer/seller arrangement 12, 14) details of the for-sale properties of sellers stored in the property database, and/or details of buyers stored in the buyer database. In this regard, as explained below, the method of facilitating a real estate exchange is described in a buyer-driven context whereby the exchangor arrangement receives details of for-sale properties and functions as the initiating party for the property purchase portion of the exchange, and as the initiated party for the property sale portion of the exchange. It should be understood, however, that the method may be equally applicable in a seller-driven context whereby the exchangor arrangement receives details of available buyers and functions as the initiating party for the property sale portion of the exchange, and as the initiated party for the property purchase portion of the exchange. Further, for example, the method may be equally applicable in a balanced context whereby the exchangor arrangement receives details of both properties and buyers or does not receive any details, and functions as either the initiating party or the initiated party for both the purchase and sale portions of the exchange.

Referring now to FIG. 4, after registering the buyer(s) and seller(s) the exchangor arrangement (buyer/seller arrangement 12, 14) can identify one or more properties of the exchangor for the sale portion of the real estate exchange, as shown in block 56. The exchangor arrangement can identify the propert(ies) for the sale portion of the exchange in any of a number of different manners. In one exemplary embodiment, for example, the exchangor arrangement can identify the respective propert(ies) by moving one or more properties from the hold and/or for-sale states to an "exchange" state. In such instances, moving the respective propert(ies) into the exchange state may trigger the facilitator arrangement 16 to send, in real-time or otherwise, availability alerts to thereby notify the buyer arrangements of the newly available property in the case of moving the property from the hold state, or further facilitate selection of the available property in the case of moving the property from the for-sale state. Also in such instances, the exchangor arrangement can group the propert(ies) in the exchange state into one or more exchange transactions, or otherwise place the identified propert(ies) into existing exchange transactions. Accordingly, one group of one or more properties can be sold in a first exchange, while one or more other groups of one or more properties can be sold in second and subsequent exchanges.

Irrespective of when or how the propert(ies) for the sale portion of the exchange are identified, the exchangor arrangement (buyer/seller arrangement 12, 14) can also identify one or more properties for the purchase portion of the exchange, as shown in block 58. Similar to identifying the properties for the sale portion of the exchange, the properties for the purchase portion of the exchange can be identified in any of a number of different manners. For example, the respective properties can be identified from the details of the for-sale properties sent by the facilitator arrangement 16 to the exchangor arrangement. Additionally or alternatively, the respective properties can be identified from one or more searches of the property database for one or more for-sale properties meeting one or more search criteria (e.g., property type, geographic region, price range, expense offset, cap rate, availability, etc.). Similar to before, the for-sale properties can include a portion of the seller information sufficient to allow the exchangor to gauge an interest in the respective properties. Also similar to before, however, to facilitate the exchangor engaging the service of the facilitator arrangement 16, the seller information may not include information sufficient to permit the exchangor to contact the sellers of the respective properties independent of the service.

As shown in block 60, as the exchangor arrangement (buyer/seller arrangement 12, 14) identifies propert(ies) for the sale portion of the exchange, the facilitator arrangement 16 or exchangor arrangement can calculate, and present to the exchangor, a running total sale price of the respective properties. Similarly, as the exchangor arrangement identifies propert(ies) for the purchase portion of the exchange, the facilitator arrangement or exchangor arrangement can calculate, and present to the exchangor, a running total purchase price of the respective properties. The facilitator arrangement or exchangor arrangement can calculate, and present to the exchangor, a running comparison between the total purchase price and the total sale price. In this regard, it may be desirable or otherwise required for the real estate exchange that the total purchase price have a predetermined relation with respect to the total sale price, or vice versa. As shown in block 62, for example, it may be desirable or otherwise required for the total purchase price to match or exceed (i.e., be at least) the total sale price, thereby resulting in a zero or otherwise positive difference between the total purchase price and the total sale price.

If the total purchase price is not at least the total sale price, the exchangor arrangement (buyer/seller arrangement 12, 14) may remove one or more properties identified for the sale portion of the exchange (see block 56), and/or identify one or more additional properties for the purchase portion of the exchange (see block 58). The running comparison can then be calculated to reflect the property removal and/or additional identification, such as to identify a total purchase price that matches or exceeds the total sale price. If not, the process of removing identified properties and/or identifying additional properties can continue until such a total purchase price is identified. As explained above, additional properties for the sale and purchase portions of the exchange can be identified, and/or identified properties can be removed from the exchange, before engaging any of the properties to effectuate the respective portions of the exchange. It should be understood, however, that identification and/or removal from the exchange of properties may occur at any point prior to completion of the real estate exchange. For example, the exchangor arrangement can identify one or more additional properties for purchase at any point before or after completing the sale of one or more of the identified properties for sale, and/or before or after completing the purchase of one or more other identified properties for purchase. Additionally or alternatively, for example, the exchangor arrangement can identify one or more additional properties for sale at any point before or after completing the purchase of one or more of the identified properties for purchase, and/or before or after completing the sale of one or more other identified properties for sale. Generally, then, the real estate exchange may be considered effectuated when the sales of identified properties for sale, and the purchases of identified properties for purchase, have been completed such that the total purchase price has the predetermined relation with respect to the total sale price, or vice versa.

After identifying properties for the sale portion and/or the purchase portion of the exchange, the exchangor arrangement (buyer/seller arrangement 12, 14) can engage those properties for a respective sale or purchase, and effectuate the sales and/or purchases of the respective properties, as shown in block 64. The properties can be engaged for sale and purchase, and the respective sales and purchases effectuated, in any of a number of different manners, such as in accordance with the method of facilitating a real estate transaction explained above with respect to FIGS. 3A and 3B. In a buyer-driven context such as that indicated above, then, the exchangor arrangement can function as the initiating party for the property purchase portion of the exchange, and as the initiated party for the property sale portion of the exchange. In such a context, for one or more identified properties of the property sale portion of the exchange, the exchangor (i.e., initiated party) can receive a non-disclosure, non-circumvent facilitation agreement from the facilitator arrangement 16, where the agreement has been executed by a buyer arrangement (i.e., initiating party) desiring to contact the exchangor with respect to one or more of those properties (see FIG. 3A, block 40). Provided the exchangor accepts the agreement (see block 42), the facilitator arrangement can provide, to the respective buyer arrangement, confidential, access-restricted information related to the exchangor (see block 44). Then, once the exchangor and the buyer are engaged in communication, the parties can be restricted from contacting other parties regarding the same respective property for a predefined engagement period (see block 46). Also once engaged in communication, the parties can conclude a real estate transaction regarding the respective property of the exchangor to thereby effectuate at least a portion of the sale portion of the exchange (see FIG. 3B, blocks 48-54).

For the property sales portion of the exchange, the facilitator arrangement 16 can forward the exchangor arrangement (i.e., initiating party) one or more non-disclosure, non-circumvent facilitation agreements (see FIG. 3A, block 38). In such instances, the facilitator arrangement can forward the exchangor arrangement a single agreement covering all of the identified properties for the purchase portion of the exchange. Alternatively, the facilitator arrangement can forward an agreement for each of the identified properties for the purchase portion of the exchange. Irrespective of the number of agreements forwarded to the exchangor arrangement, after the exchangor executes the non-disclosure, non-circumvent facilitation agreement(s), and the exchangor arrangement returns the executed agreement to the facilitator arrangement, the facilitator arrangement can forward the agreement to the seller arrangement 14 (i.e., initiated party arrangement) for acceptance by the respective seller (see block 40). Provided the seller accepts the agreement (see block 42), the facilitator arrangement can provide, to the exchangor arrangement, confidential, access-restricted information related to the identified property and the respective seller (see block 44). Similar to before, once the exchangor and the seller are engaged in communication, the parties can be restricted from contacting other parties regarding the same respective property for a predefined engagement period (see block 46). Also once engaged in communication, the parties can conclude a real estate transaction regarding the respective property of the seller to thereby effectuate at least a portion of the purchase portion of the exchange (see FIG. 3B, blocks 48-54).

For each identified property for sale and purchase, the exchangor can engage a buyer or seller arrangement 12, 14 to effectuate the respective sale or purchase, such as in the manner explained above. The real estate exchange, then, may be considered effectuated following the sales and purchases of identified properties such that the total purchase price has the predetermined relation with respect to the total sale price, or vice versa, as indicated above. As will be appreciated, once the sale of a property of the exchangor is complete, the respective property may be removed from the property database of the facilitator arrangement 16, or may otherwise have its ownership changed from the exchangor to the buyer. Similarly, once the purchase of a property by the exchangor is complete, the respective property may have its ownership changed from the seller to the exchangor. In either instance, once a property's ownership has been changed from one party to another, the property may be moved from a for-sale state to a hold state within the property database, the property thereby being made readily available for future transactions.

Figure 5:
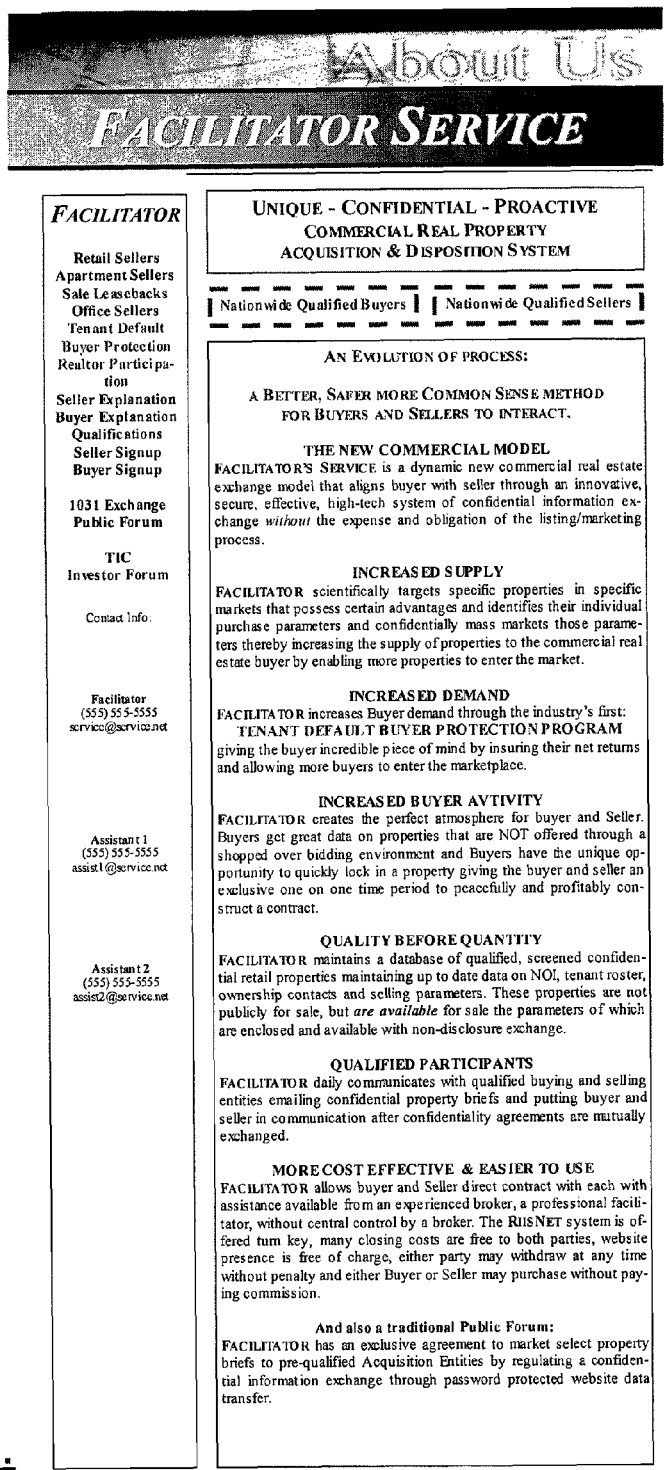

To further illustrate the benefits of the present invention, reference is now made to FIGS. 5-20, which illustrate exemplary displays, such as Web pages, capable of being provided by the facilitator arrangement 16 to the buyer arrangement 12 and/or seller arrangement. In this regard, although various ones of the displays and other figures include language further illustrating exemplary embodiments of the present invention, such language should not be taken to limit the spirit and scope of the present invention. The displays may be provided across the Internet (e.g., network 18), and thereafter presented by the respective arrangement for display to the buyer and/or seller. More particularly, as shown in FIG. 5, the facilitator arrangement can provide a portal that can explain the service offered by the facilitator arrangement, and include a number of links to other displays that permit the buyer arrangement and/or seller arrangement to engage the service. For example, the display of FIG. 5 can include a link to "Seller Explanation," "Buyer Explanation" and "Program Qualifications" displays, which direct the facilitator arrangement to provide the displays of FIGS. 6, 7 and 8, respectively.

FIG. 6, then, illustrates a display that explains the service offered by the facilitator arrangement 16 to seller arrangements 14, and FIG. 7 illustrates a display that explains the service offered to buyer arrangements 12. FIG. 8, on the other hand, illustrates a display that explains the qualifications of the program or service, as well as that of seller arrangements and buyer arrangements participating in the program or service. In addition, the displays of FIGS. 6 and 7, as well as the portal display of FIG. 5, can include a link to permit a seller arrangement or a buyer arrangement to register with the facilitator arrangement, or more particularly with the service offered by the facilitator arrangement (see block 32 of FIG. 3A). Should a seller arrangement or buyer arrangement desire to register with the service, the seller arrangement or buyer arrangement can execute a respective link, which can direct the facilitator arrangement to provide the sign-up form displays of FIGS. 9 and 10, respectively. As shown in FIGS. 9 and 10, the seller arrangements and buyer arrangements can provide the facilitator arrangement with information regarding the properties of the sellers and/or the sellers themselves, or information regarding the buyers can be generated, gathered or otherwise received by the facilitator arrangement. As indicated above, after the facilitator arrangement 16 receives the buyer information or the seller information, the facilitator arrangement can evaluate the information to at least partially ensure that the buyers are legitimate and qualified to purchase an indicated level of real estate, or to allow the facilitator arrangement to provide data related to the properties of the sellers.

Figure 12:
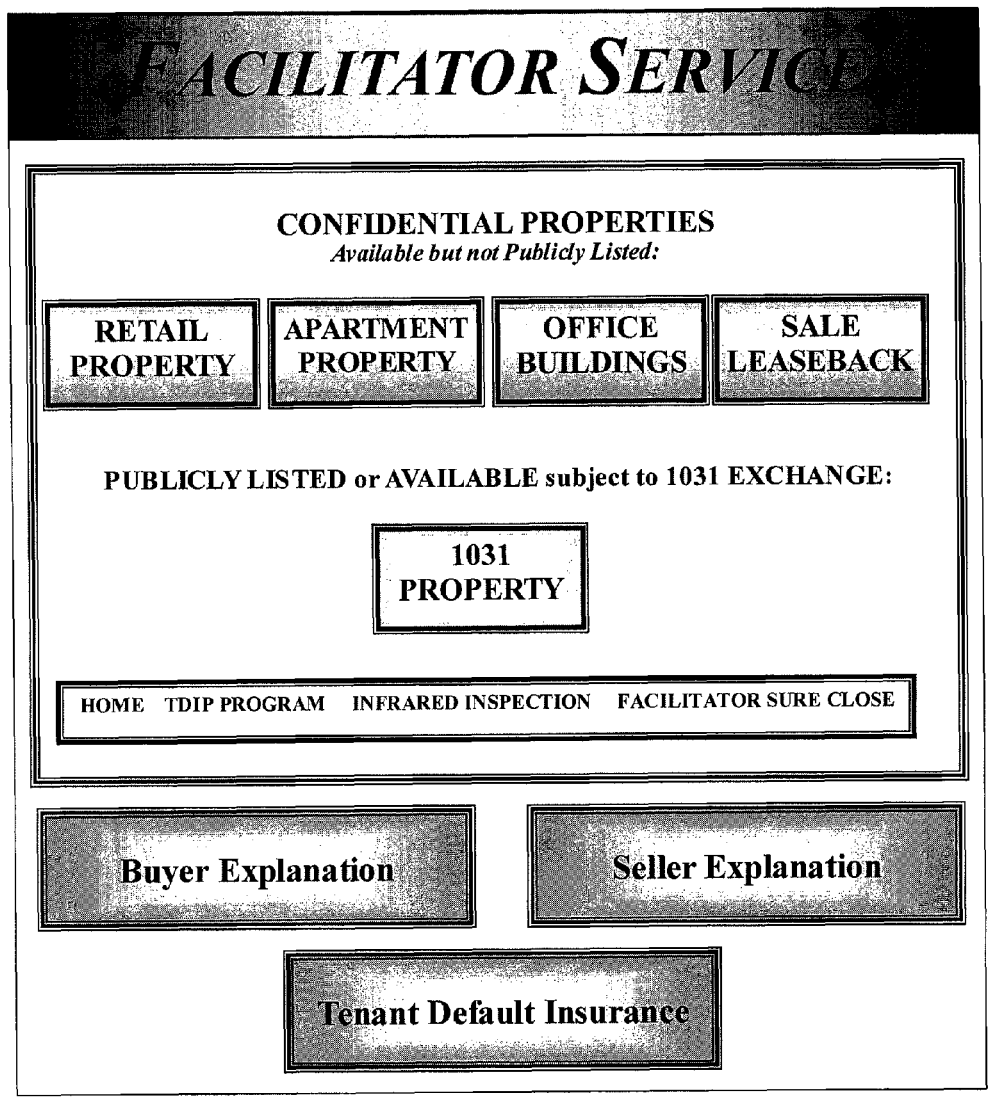
Figure 13:
Figure 14:
Figure 15:
Figure 16:

For buyer arrangements 12 and seller arrangements 14 registered with the service provided by the facilitator arrangement 16, as well as buyer and seller arrangements not registered with the service (if so desired), the facilitator arrangement provide details of buyers and properties (see block 34 of FIG. 3A). More particularly, as shown in FIG. 11, the facilitator arrangement can provide a display of acquisition entities (i.e., buyers), including a portion of the buyer information stored in the buyer database, the buyer information being sufficient to allow sellers to gauge an interest in the buyers. As shown in FIG. 12, the facilitator arrangement can provide a portal to details of confidential retail, apartment, office and sale-leaseback properties, as well as publicly listed or available properties subject to IRS 1031 tax deferred exchange. From the portal of details (as well as the portal of FIG. 5), the facilitator arrangement can provide displays of retail properties (FIG. 13), apartment properties (FIG. 14), office properties (FIG. 15), sale-leaseback properties (FIG. 16), 1031 properties (FIG. 17) and/or land, condominium complexes, industrial and/or non-real estate properties (not shown). Within each display, then, the facilitator arrangement can include details of respective properties, as well as a portion of the seller information stored in the property database, the portion of the information being sufficient to allow buyers to gauge an interest in the properties.

Figure 18:

For buyer arrangements 12 and seller arrangements 14 registered with the service provided by the facilitator arrangement 16, the facilitator arrangement can provide a participant home page or display from which the respective party can manage their activity or the cumulative activity of their authorized participants, with respect to the service, as shown in FIG. 18. In this regard, the participant home page can include an availability alert portion (shown under the heading "property availability alert") including details of newly available properties (or buyers), and an activity dashboard portion (shown under the heading "urgent activities and notifications") including details of properties undergoing recent changes (e.g., lease review, completed appraisal, request for engagement—RFE, etc.) to their respective records in the property database. Additionally or alternatively, for example, the participant home page can include a property watch list including details of for-sale properties that meet the participant's predefined search criteria.

Also, for example, the participant home page can include a hold, sell, engaged property portion (shown under the heading "my properties") including separate details of properties of the participant in the hold state, for-sale and engaged states. As also shown, the engaged properties details can further include a status of the properties respective engagements, an expiration of the respective engagements, and/or whether the participant is the potential buyer or seller with respect to the respective engagements. In addition, for example, the participant home page can include a search matrix portion (shown under the heading "searches") from which the participant can search for-sale properties in the property database of the facilitator arrangement 16 based upon one or more search criteria (e.g., property type, square footage, geographic region, State, MSA, market size, price range, expense offset, cap rate, availability, average lease term remaining, percentage occupancy, percentage of national or credit tenants, etc.). Additionally, the search matrix portion may permit advanced searches whereby one or more criteria (e.g., price range, etc.) may be broadened, and/or one or more criteria (e.g., State, square footage, etc.) may be narrowed. The search criteria thereafter being used, for example, to specify the properties for which the participant receives availability alerts.

As further shown, the participant home page can include an exchange matrix populator portion (shown under the heading "create exchange") from which the participant can initiate a real estate exchange with respect to one or more properties of the participant. In this regard, the participant home page can be configured such that the participant can initiate a real estate exchange by dragging one or more properties from the details of held and/or sale properties (e.g., in the hold, sell, engaged property portion), and dropping those propert(ies) in the exchange matrix populator portion, the respective propert(ies) being identified for the purchase portion of an exchange by the dragging and dropping operations (see FIG. 4, block 56). To continue a real estate exchange, the participant (i.e., exchangor) can then be directed to an exchange portal, such as that shown in FIG. 19.

Although not shown, the participant home page can include further tools for managing their activity with respect to the service. For example, the participant home page can include a portfolio portion including one or more real estate portfolios defined by the participant, each portfolio including a group of properties that, for various events, may be treated as a collective whole. Also, for example, the participant home page can include a tenant-in-common (TIC) portion including one or more properties, and/or one or more groups of properties, for which the participant has a TIC ownership with one or more other TIC owners, who may or may not be participants of the service. Further, for example, the participant home page can include a portion including one or more upstream Gantt charts for properties under contract, each Gantt chart identifying one or more tasks to be completed to conclude a transaction such that the participant can view their progression to conclusion of the transaction.

As shown in FIG. 19, the exchange portal can include an exchange list portion for managing different real estate exchange transactions, and the properties included in each transaction. The exchange portal can also include details of properties identified for the sale portions of the different exchange transactions (shown under the heading "properties I'm selling"), where the properties identified or identifiable for particular exchange transactions (e.g., "exchange 3") can be shown via a check box (checked or un-checked). The exchange portal can further include a property search portion (shown under the heading "search for properties to buy") from which the exchangor can search for-sale properties in the property database of the facilitator arrangement 16 based upon one or more search criteria. From the results of such searches, then, the exchangor can identify one or more properties for the purchase portion of the exchange (see block 58), those properties being included in details of such properties (shown under the heading "properties I'm buying or want to buy").

As further shown in FIG. 19, as the exchangor arrangement (buyer/seller arrangement 12, 14) identifies propert(ies) for the sale portion of the exchange, a running total sale price of the respective properties can be calculated and presented on the exchange portal (see block 60). Similarly, as the exchangor arrangement identifies propert(ies) for the purchase portion of the exchange, a running total purchase price of the respective properties can be calculated and presented on the exchange portal. Further, a running comparison (e.g., difference) between the total purchase price and the total sale price can be calculated and presented on the exchange portal. Thus, the exchangor may continue by identifying additional properties, and/or removing identified properties from the exchange, until a predetermined relationship between the total purchase price and total sale price is met (e.g., total purchase price at least the total sale price) (see block 62).

The exchange portal can further include a button or other selectable element (shown as "execute exchange") such that, after identifying properties for the sale portion and/or the purchase portion of the exchange, the exchangor execute the exchange to thereby initiate engaging the identified properties (see block 64). Then, as explained above, for those properties for which the exchangor is the initiating party (e.g., for the purchase portion of the exchange), the exchangor can receive from the facilitator arrangement 16, and thereafter execute, a non-disclosure, non-circumvent facilitation agreement. Then, after the exchangor has accepted the agreement, the facilitator arrangement can provide, to the exchangor arrangement, confidential, access-restricted information related to the initiated party (see blocks 38-44 of FIG. 3A). In contrast, for those properties for which the exchangor is the initiated party (e.g., for the sale portion of the exchange), the exchangor can receive, for acceptance, a non-disclosure, non-circumvent facilitation agreement executed by the initiating party.

Once the exchangor and initiating/initiated parties are engaged in communication for properties of the exchange, the parties can be restricted from contacting other parties with respect to those properties for a predefined engagement period (e.g., five days). For example, the facilitator arrangement 16 can restrict access to the buyer arrangement 14 and the respective property of the seller arrangement 14 from the details of buyers and properties. In this regard, the facilitator arrangement can restrict access to the buyer arrangement by blanking out the entry for the buyer in the display of buyers and identifying the buyer as being "Engaged," shown in FIG. 11. Similarly, the facilitator arrangement can restrict access to the respective property by blanking out the entry for the property in the display of properties and identifying the property as being "Engaged," shown in FIG. 12. As indicated above, by restricting each party from communicating with other parties during the engagement period, the facilitator arrangement can facilitate the parties concluding a real estate transaction with one another without outside interference.

After the exchangor and initiating/initiated parties are engaged in communication, if the parties can conclude real estate transactions for the respective properties to thereby effectuate the real estate exchange (see block 48), the facilitator can collect predefined fees from the initiating party for the service provided by the facilitator (see blocks 50 and 52). Also at the conclusion of the transactions, if so desired and previously offered by the facilitator, the facilitator can provide the buyer with a limited duration tenant default insurance policy (see block 54). In this regard, as the buyer arrangements 12 and seller arrangements 14 engage the service offered by the facilitator arrangement 16, the facilitator arrangement can provide the buyer arrangements and seller arrangements with information regarding such a policy, as shown in the display of FIG. 20. And by providing such information, the facilitator arrangement can facilitate the buyer arrangements and seller arrangements registering with the service offered by the facilitator arrangement, and concluding a transaction while engaging the service.

As will be appreciated, the service of the facilitator arrangement 16 described herein can be provided in a number of different contexts relating to real estate, from commercial to residential real estate. It should be understood, however, that the service can generally be provided in any of a number of different contexts involving a buyer and a seller of a good. For example, the service can be provided by the facilitator arrangement in the context of an auction offering of a good by a seller to a number of buyers, such as in the context of an online auction (e.g., eBay).

Also, the tenant default insurance described herein can be provided in conjunction with a real estate transaction between a buyer arrangement 12 and a seller arrangement 14. It should be understood, however, that the tenant default insurance can be provided independent of such a transaction, without departing from the spirit and scope of the present invention. For example, the tenant default insurance can be provided to a buyer arrangement independent of the transaction between the buyer and a seller of a respective property. Alternatively, for example, the tenant default insurance can be provided to an owner of a property at any point during the ownership tenure of the owner. Also, it should be understood that the tenant default insurance can also be provided in conjunction with other investment tools such as tenant-in-common ownership, REIT (real estate investment trust) ownership and/or IRS 1031 tax deferred exchange programs to create a new investment vehicle that offers a guarantee of a certain level of income to the new buyer during initial ownership, or during a period extending beyond initial ownership, if so provided by the facilitator arrangement.

According to one aspect of the present invention, all or a portion of the system of the present invention, such as all or portions of the buyer arrangement 12, seller arrangement 14 and/or facilitator arrangement 16, generally operates under control of a computer program product. The computer program product for performing the methods of exemplary embodiments of the present invention includes a computer-readable storage medium, such as the non-volatile storage medium, and computer-readable program code portions, such as a series of computer instructions, embodied in the computer-readable storage medium.

In this regard, FIGS. 3A, 3B and 4 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the control flow diagrams support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for facilitating a real estate exchange, the real estate exchange including a sale portion and a purchase portion, the apparatus comprising:

a processor configured to identify or receive an identification of at least one property of an exchangor for the sale portion of the exchange, and at least one property of at least one seller for the purchase portion of the exchange, wherein the properties of the exchangor and the sellers have associated property information stored in a property database, wherein the processor is configured to engage the properties for the sale and purchase portions of the exchange to thereby facilitate the exchange, including being configured to provide a buyer with at least a portion of the property information associated with at least one property identified for the sale portion of the exchange, and provide the exchangor with at least a portion of the property information associated with at least one property identified for the purchase portion of the exchange, and wherein the processor being configured to engage the properties further includes being configured to:

engage the exchangor and at least one of the buyer or seller for an engagement period, the exchangor and at least one of the buyer or seller being engaged regarding at least one of property of the exchangor identified for the sale portion of the exchange, or property of the seller identified for the purchase portion of the exchange; and restrict the engaged exchangor and at least one of the buyer or seller from communicating with other buyers or sellers regarding the respective properties during the engagement period.

2. The apparatus to claim 1, wherein the processor is further configured to calculate a running comparison of a total sale price of the properties for the sale portion and a running total purchase price of the properties for the purchase portion, the processor being configured to calculate the running comparison as the properties are identified, wherein the processor is configured to determine if a predetermined relationship between the total sale price and total purchase price is met based upon the running comparison, and adjust or receive an adjustment of the properties identified for at least one of the sale portion or the purchase portion of the exchange if the predetermined relationship is not met, wherein the processor being configured to adjust or receive an adjustment of the properties includes being configured to remove or receive removal of at least one identified property, or identifying or receive an identification of at least one additional property, and wherein the processor is configured to repeatedly determine if the predetermined relationship is met and adjust or receive an adjustment of the properties until the predetermined relationship is met.

3. The apparatus according to claim 1, wherein at least a portion of the property information comprises access-restricted information, and wherein the processor being configured to provide at least a portion of the property information associated with at least one property identified for the sale portion of the exchange or the purchase portion of the exchange includes being configured to provide at least a portion of the access-restricted information.

4. The apparatus according to claim 3, wherein the processor is further configured to receive at least one of an executed agreement from the buyer before providing the buyer with the access-restricted information, or an executed agreement from the exchangor before providing the exchangor with the access-restricted information.

5. The apparatus according to claim 1, wherein the processor is configured to identify or receive an identification of at least one property comprising an income-producing property having at least one tenant, and wherein the processor is configured to facilitate insuring at least one of the exchangor or buyer for a period of time against a loss of income due to a default of at least one tenant, being configured to facilitate insuring the exchangor if the exchangor concludes a real estate transaction regarding an income-producing property identified during the purchase portion of the exchange, or facilitate insuring the buyer if the exchangor concludes a real estate transaction regarding an income-producing property identified during the sale portion of the exchange.

6. A method for facilitating a real estate exchange, the real estate exchange including a sale portion and a purchase portion, the method being performed by execution of computer-readable program code by at least one processor of at least one computer system, the method comprising:

identifying or receiving, using at least one of the processors, an identification of at least one property of an exchangor for the sale portion of the exchange, and at least one property of at least one seller for the purchase portion of the exchange, wherein the properties of the exchangor and the sellers have associated property information stored in a property database; and engaging, using at least one of the processors, the properties for the sale and purchase portions of the exchange to thereby facilitate the exchange, wherein engaging the properties comprises providing a buyer with at least a portion of the property information associated with at least one property identified for the sale portion of the exchange, and providing the exchangor with at least a portion of the property information associated with at least one property identified for the purchase portion of the exchange, and wherein engaging the properties further comprises:

engaging the exchangor and at least one of the buyer or seller for an engagement period, the exchangor and at least one of the buyer or seller being engaged regarding at least one of property of the exchangor identified for the sale portion of the exchange, or property of the seller identified for the purchase portion of the exchange; and restricting the engaged exchangor and at least one of the buyer or seller from communicating with other buyers or sellers regarding the respective properties during the engagement period.

7. The method according to claim 6 further comprising:

calculating a running comparison of a total sale price of the properties for the sale portion and a running total purchase price of the properties for the purchase portion, calculating the running comparison being performed as the properties are identified;

determining if a predetermined relationship between the total sale price and total purchase price is met based upon the running comparison; and adjusting or receiving an adjustment of the properties identified for at least one of the sale portion or the purchase portion of the exchange if the predetermined relationship is not met, wherein adjusting or receiving an adjustment of the properties identified includes removing or receiving removal of at least one identified property, or identifying or receiving an identification of at least one additional property, wherein determining if a predetermined relationship is met adjusting or receiving an adjustment of the properties are performed until the predetermined relationship is met.

8. The method according to claim 6, wherein at least a portion of the associated property information comprises access-restricted information, and wherein providing at least portion of the property information associated with at least one property identified for the sale portion of the exchange or the purchase portion of the exchange comprises providing at least a portion of the access-restricted information.

9. The method according to claim 8 further comprising:
receiving at least one of an executed agreement from the buyer before providing the buyer with the access-restricted information, or an executed agreement from the exchangor before providing the exchangor with the access-restricted information.

10. The method according to claim 6, wherein identifying or receiving an identification includes identifying or receiving an identification of an income-producing property having at least one tenant, and wherein the method further comprises:
facilitating insuring at least one of the exchangor or buyer for a period of time against a loss of income due to a default of at least one tenant, including facilitating insuring the exchangor if the exchangor concludes a real estate transaction regarding an income-producing property identified during the purchase portion of the exchange, or facilitating insuring the buyer if the exchangor concludes a real estate transaction regarding an income-producing property identified during the sale portion of the exchange.

11. A computer-program product for facilitating a real estate exchange, the real estate exchange including a sale portion and a purchase portion, the computer program product comprising at least one computer-readable storage medium having computer-executable program code portions stored therein, the computer-executable program code portions comprising:
a first executable portion identify or receive an identification of at least one property of an exchangor for the sale portion of the exchange, and at least one property of at least one seller for the purchase portion of the exchange, wherein the properties of the exchangor and the sellers have associated property information stored in a property database; and
a second executable portion configured to engage the properties for the sale and purchase portions of the exchange to thereby facilitate the exchange, the second executable portion being configured to engage the properties including being configured to provide a buyer with at least a portion of the property information associated with at least one property identified for the sale portion of the exchange, and provide the exchangor with at least a portion of the property information associated with at least one property identified for the purchase portion of the exchange, and
wherein the second executable portion being configured to engage the properties further includes being configured to:
engage the exchangor and at least one of the buyer or seller for an engagement period, the exchangor and at least one of the buyer or seller being engaged regarding at least one property of the exchangor identified for the sale portion of the exchange, or property of the seller identified for the purchase portion of the exchange; and
restrict the engaged exchangor and at least one of the buyer or seer from communicating with other buyers or sellers regarding the respective properties during the engagement period.

12. The computer-program product according to claim 11, wherein the computer-executable program code portions further comprise:
a third executable portion configured to calculate a running comparison of a total sale price of the properties for the sale portion and a running total purchase price of the properties for the purchase portion, the third executable portion being configured to calculate the running comparison as the properties are identified;
a fourth executable portion configured to determine if a predetermined relationship between the total sale price and total purchase price is met based upon the running comparison; and
a fifth executable portion configured to adjust or receive an adjustment of the properties identified for at least one of the sale portion or the purchase portion of the exchange if the predetermined relationship is not met, wherein the fifth executable portion being configured to adjust or receive an adjustment of the properties includes being configured to remove or receive removal of at least one identified property, or identify or receive an identification of at least one additional property,
wherein the fourth and fifth executable portions are configured to determine if the predetermined relationship is met and adjust or receive an adjustment of the identified properties until the predetermined relationship is met.

13. The computer-program product according to claim 11, wherein at least a portion of the property information comprises access-restricted information, and wherein the second executable portion being configured to provide at least a portion of the property information associated with at least one property identified for the sale portion of the exchange or the purchase portion of the exchange includes begin configured to provide at least a portion of the access-restricted information.

14. The computer-executable product according to claim 13, wherein the computer-readable program code portions further comprise:
a third executable portion configured to receive at least one of an executed agreement from the buyer before providing the buyer with the access-restricted information, or an executed agreement from the exchangor before providing the exchangor with the access-restricted information.

15. The computer-executable product according to claim 11, wherein the first executable portion being configured to identify or receive an identification of at least one property includes being configured to identify or receive an identification of an income-producing property having at least one tenant, and wherein the computer-readable program code portions further comprise:
a third executable portion configured to facilitate insuring at least one of the exchangor or buyer for a period of time against a loss of income due to a default of at least one tenant, including being configured to facilitate insuring the exchangor if the exchangor concludes a real estate transaction regarding an income-producing property identified during the purchase portion of the exchange, or facilitate insuring the buyer if the exchangor concludes a real estate transaction regarding an income-producing property identified during the sale portion of the exchange.

* * * * *

UNITED STATES PATENT AND TRADEMARK OFFICE
CERTIFICATE OF CORRECTION

| | |
|---|---|
| PATENT NO. | : 7,801,739 B2 |
| APPLICATION NO. | : 11/556280 |
| DATED | : September 21, 2010 |
| INVENTOR(S) | : Smith |

It is certified that error appears in the above-identified patent and that said Letters Patent is hereby corrected as shown below:

Column 21,

Line 52, "identifying" should read --identify--.

Signed and Sealed this
Twenty-seventh Day of December, 2011

David J. Kappos
*Director of the United States Patent and Trademark Office*